United States Patent
Sakai et al.

(10) Patent No.: US 6,804,414 B1
(45) Date of Patent: Oct. 12, 2004

(54) IMAGE STATUS DETECTING APPARATUS AND DOCUMENT IMAGE CORRECTING APPARATUS

(75) Inventors: Kenichiro Sakai, Kawasaki (JP); Hirotaka Chiba, Kawasaki (JP); Tsugio Noda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/233,498

(22) Filed: Jan. 20, 1999

(30) Foreign Application Priority Data

May 1, 1998 (JP) ............................................. 10-122577
May 22, 1998 (JP) ............................................. 10-140871

(51) Int. Cl.$^7$ ................................................. G06K 9/32
(52) U.S. Cl. ....................... 382/289; 382/291; 382/296; 382/297; 358/488; 358/496
(58) Field of Search ................................. 382/289, 290, 382/291, 293, 295, 296, 297, 135, 137, 151, 170, 173, 157, 176, 177, 178, 179, 180, 185, 186, 187, 190, 209, 215, 216, 218, 219, 229, 231, 278, 282, 287; 358/453, 462, 488, 496; 345/648, 649, 657, 659

(56) References Cited

U.S. PATENT DOCUMENTS

| | | | |
|---|---|---|---|
| 4,659,213 A | | 4/1987 | Matsumoto |
| 5,031,225 A | * | 7/1991 | Tachikawa et al. .......... 382/181 |
| 5,077,811 A | * | 12/1991 | Onda ......................... 382/185 |
| 5,381,163 A | * | 1/1995 | Yokoyama ................... 345/126 |
| 5,754,674 A | * | 5/1998 | Ott et al. .................... 382/112 |
| 5,781,660 A | * | 7/1998 | Nitta et al. ................... 382/177 |
| 5,809,183 A | * | 9/1998 | Serizawa et al. ............ 382/301 |
| 5,835,632 A | * | 11/1998 | Takasu et al. ............... 382/185 |
| 5,852,685 A | * | 12/1998 | Shepard ....................... 382/311 |
| 5,854,853 A | * | 12/1998 | Wang ........................... 382/176 |

FOREIGN PATENT DOCUMENTS

| | | |
|---|---|---|
| EP | 0 725 359 A1 | 8/1996 |
| JP | 5-324902 | 12/1993 |
| JP | 07-028945 | 1/1995 |
| JP | 8-212298 | 8/1996 |
| JP | 09-289581 | 11/1997 |
| JP | 11-213089 | 8/1999 |

OTHER PUBLICATIONS

Communication from the European Patent Office dated Jan. 16, 2003, including European Search Report.

* cited by examiner

Primary Examiner—Jayanti K. Patel
Assistant Examiner—Yosef Kassa
(74) Attorney, Agent, or Firm—Staas & Halsey LLP

(57) ABSTRACT

Characters read as images at different angles and as mirrored images in accordance with scanning directions are detected by an character recognition procedure, and are converted into erecting images. Such character images have low character recognition rates, therefore, a character image is extracted from the scanned image, a rotated angle and an existence of mirroring in which the recognition rate becomes maximum are detected. Then, the same rotation and mirroring are applied to the scanned image, thereby capable of converting the scanned image into an erecting image.

42 Claims, 31 Drawing Sheets

HORIZONTAL DISPLAY TYPE

VERTICAL DISPLAY TYPE

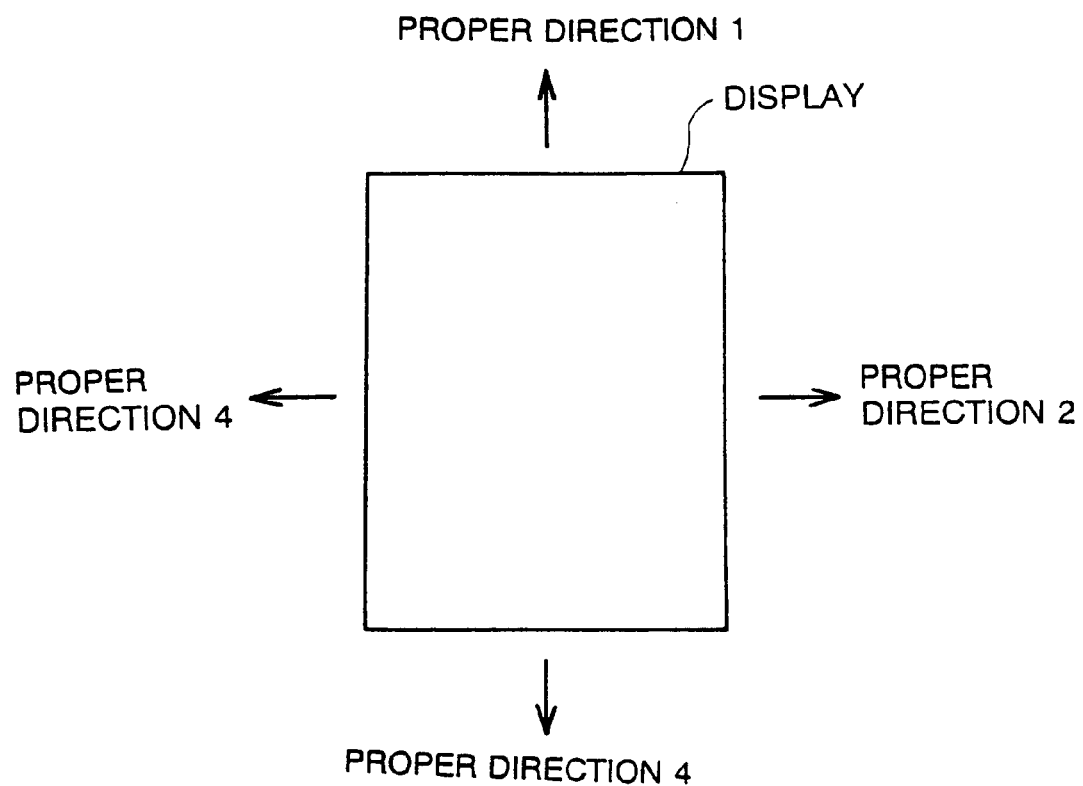

FIG. 9

| CHARACTER IMAGE DIRECTION DETECTED RESULT | | DOCUMENT IMAGE CONVERSION PROCEDURE INTO PROPER IMAGE | | | |
|---|---|---|---|---|---|
| ROTATED ANGLE | EXISTENCE OF MIRRORING | PROPER DIRECTION 1 | PROPER DIRECTION 2 | PROPER DIRECTION 3 | PROPER DIRECTION 4 |
| 0° | NO | (NO CONVERSION) | A | B | C |
| 90° | NO | A | B | C | (NO CONVERSION) |
| 180° | NO | B | C | (NO CONVERSION) | A |
| 270° | NO | C | (NO CONVERSION) | A | B |
| 0° | EXIST | D | G | F | E |
| 90° | EXIST | E | D | G | F |
| 180° | EXIST | F | E | D | G |
| 270° | EXIST | G | F | E | D |

(A THROUGH G INDICATING CONVERSION DIRECTION)

CONVERTED IMAGE

SYMBOLS ① THROUGH ④ SHOWING CORRESPONDENCES OF CORNERS BEFORE AND AFTER CONVERSION

INPUTTED IMAGE

INPUTTED IMAGE

CONVERTED IMAGE

INPUTTED IMAGE  CONVERTED IMAGE

INPUTTED IMAGE

CONVERTED IMAGE

INPUTTED IMAGE

CONVERTED IMAGE

INPUTTED IMAGE

CONVERTED IMAGE

INPUTTED IMAGE

CONVERTED IMAGE

FIG. 19

| CHARACTER KIND | BLACK PIXEL RATIO | LONG-SIDE TO SHORT-SIDE RATIO | RELIABILITY |
|---|---|---|---|
| CHINESE CHARACTER | 27% | 1.04 | 946 |
| HIRAGANA CHARACTER | 16% | 1.19 | 874 |
| KATAKANA CHARACTER | 14% | 1.24 | 885 |
| ALPHANUMERIC | 24% | 1.39 | 854 |
| SYMBOL | 28% | 2.99 | 735 |

FIG. 20
| | INPUTTED CHARACTER IMAGE | BLACK PIXEL RATIO | LONG-SIDE TO SHORT-SIDE RATIO | PIXEL SIZE |
|---|---|---|---|---|
| (a) |  | ○ 34% | × 2.23 | × 41×18 |
| (b) |  | × 16% | × 1.11 | ○ 36×40 |
| (c) |  | × 68% | × 2.17 | × 13×6 |
| (d) |  | ○ 42% | ○ 1.02 | ○ 42×41 ⇨ SELECT |
| (e) | 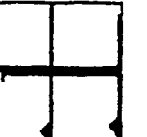 | × 18% | ○ 1.08 | ○ 37×40 |
| (f) |  | ○ 34% | ○ 1.02 | ○ 41×42 ⇨ SELECT |
| (g) | 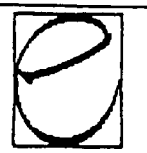 | × 15% | × 1.17 | ○ 35×41 |
SELECTION CONDITION
 BLACK PIXEL RATIO = NOT LESS THAN 25% AND NOT MORE THAN 60%
 LONG-SIDE TO SHORT-SIDE RATIO = NOT MORE THAN 1.10
 PIXEL SIZE = NOT LESS THAN 30×30 PIXELS

RELIABILITY =389

INPUTTED CHARACTER IMAGE

713

90° ROTATION

571

180° ROTATION

428

270° ROTATION

611

MIRRORING

992  ⇨ CORRECT CHARACTER DIRECTION

90° ROTATION + MIRRORING

533

180° ROTATION + MIRRORING

483

270° ROTATION + MIRRORING

RELIABILITY =492

INPUTTED CHARACTER IMAGE

523

MIRRORING

MIS-DETECTED CHARACTER DIRECTION ⇐ 985

90° ROTATION

984 ⇒ CORRECT CHARACTER DIRECTION

90° ROTATION + MIRRORING

547

180° ROTATION

587

180° ROTATION + MIRRORING

549

270° ROTATION

558

270° ROTATION + MIRRORING

| | 0° | 90° | 180° | 270° |
|---|---|---|---|---|
| RECOGNITION RELIABILITY | 0.90 | 0.40 | 0.30 | 0.50 |

# IMAGE STATUS DETECTING APPARATUS AND DOCUMENT IMAGE CORRECTING APPARATUS

BACKGROUND OF THE INVENTION

1. Field of the Invention

The present invention relates to an image status detecting apparatus detecting a status of an image (particularly a document image) inputted through an image input device such as a scanner and relates to a document image correcting apparatus correcting an image inputted through an image input device into an erecting image. Particularly, the present invention relates to a document image correcting apparatus detecting a direction of a document by detecting a rotated angle and an existence of mirroring (reflected-inversion) of a character among characters inputted in a state that these are rotated and mirrored (reflectively inverted).

2. Description of the Related Art

In late years, as an image scanner is used as an input device for a document image. Small handy scanners for manual operation, which are carried easily, are developed and manufactured in addition to fixed-flatbed scanners which are conventional image scanners.

As to handy scanners, an user can scan in any direction, namely, an user can use a handy scanner flexibly. However, there are cases in that a rotated image and a mirrored image are read as images due to a reading (scanning) direction which is a relative direction between a sheet and a scanner, therefore, it is necessary to correct the image by rotating or rotating after scanning. For example, this case occurs when a document written horizontally is read from the top of the document.

Further, there is a possibility in that a whole document is mirrored and inputted. In a document written horizontally, a sentence is usually written from left to right. When this document is scanned from right to left, the inputted characters are mirrored characters. Such mirroring occurs when a back and a face of a permeable sheet such as an OHP sheet is reversed in spite of a fixed-flatbed scanner.

Thus, when a process such as character recognition is applied to the inputted document image, the document is not inputted in a proper direction and an accuracy of the character recognition lowers in a case that a character is rotated and mirrored, therefore, it is necessary to correct the document image into an erecting image after inputting document image in order to direct the document read in this way to a correct direction.

There are conventional document image erecting method such as Japan Patent Application Laid-Open 8-212298 and Japan Patent Application Laid-Open 7-28945.

Japan Patent Application Laid-Open 8-212298 discloses, as shown in FIG. 31, a technique in which an inputted character is recognized from four directions such as angles of 0°, 90°, 180° and 270°, an accuracy value of the character recognition is obtained, and the direction having the highest accuracy value is judged as the document direction.

However, Japan Patent Application Laid-Open 8-212298 gives no description that a mirrored character is corrected. For example, though a symmetric character is read conversely, there is a high possibility in that the apparatus recognizes this character as normal. Further, the accuracy value is obtained from the character recognition result regardless of the reading direction, therefore, there is a case that the accuracy value becomes higher than a character read in a correct direction.

Japan Patent Application Laid-Open 7-28945 discloses a technique, in which a character is unsuitable to judge the direction of document, such as a left-right symmetric character, a upside-down symmetric character, a point symmetric character, a character which looks like another character when turned upside down, a character which looks like another character when mirrored, therefore, when this character is clipped, the clipping process is re-executed.

SUMMARY OF THE INVENTION

The present invention is developed in order to solve this problem, and has its object to provide a document image correcting apparatus detecting a status of a document image inputted through an input device such as a scanner with an image status detecting apparatus, and automatically correcting document images into a proper image even if a rotated document image, a reversed document image or a rotated/mirrored image.

The present invention has another object to determine a character to be extracted based on a specific condition when a character is extracted in order to use only specific kinds of characters for judging the rotation and the mirroring of the document. Concretely, characters used for judgment are selected by using a value of which a standard value varies in accordance with a kind of a character, such as a length-breath ratio, a black (white) pixel ratio and a pixel size.

The present invention adapts the following in order to solve the above-described problem.

The first aspect of the present invention is an image status detecting apparatus detecting whether or not a character image inputted through an image input unit is mirrored horizontally or vertically and/or what degree the character image is rotated compared with an original character. The image status detecting apparatus comprises an image converting unit for rotating and for mirroring the character image inputted through the image input unit; a character recognizing unit for referring a character recognition dictionary storing character feature information and for obtaining candidate characters resemble to the character image mirrored and rotated by the image converting unit and a recognition rate indicating a degree of recognition certainty; and a conversion procedure detecting unit for detecting, based on the candidate characters and the recognition rate obtained by the character recognizing unit, a rotation angle and an existence of mirroring needed to direct the character image to a proper direction.

The second aspect of the present invention is a document image correcting apparatus using this image status detecting apparatus. The document image correcting apparatus comprises a character image storing unit for storing a character image inputted through image input unit; an image status detecting unit for detecting whether or not the character image stored in the character image storing unit is mirrored and what degree the character image is rotated compared with an original character; and an image correcting unit for directing the character image stored in the character image storing means to the proper direction based on a detected result of the image status detecting means.

Further, the image status detecting units may comprise an image converting unit for rotating and for mirroring the character image inputted through the image input unit; a character recognizing unit for referring a character recognition dictionary storing character feature information and for obtaining candidate characters resemble to the character image mirrored and rotated by the image converting unit and a recognition rate indicating a degree of recognition certainty; and a conversion procedure detecting unit for detecting, based on the candidate characters and the recognition rate obtained by the character recognizing means, a rotation angle and an existence of mirroring needed to direct the original character image to a proper direction.

In these aspects, a scanner, more particularly, a hand-held scanner is generally used as the image input unit. A document image including a line (and lines) of plural characters is read by the scanner. Then, it is preferable that the document image is temporarily stored in the document image storing unit (such as a memory) and then at one or more specific character is extracted from the document image and is stored in the character image storing unit (such as a memory).

When a hand-held scanner is used, the read image is mirrored in a case that the scanning direction differs from the original document direction. Thus, the image status detecting unit detects whether or not the character image stored in the character image storing unit is mirrored as to the original character. When the image status detecting unit judges that the character image is mirrored, the image correcting unit makes the character image stored in the character storing unit erecting.

The image status detecting unit also detects what degree the character image is rotated compared with an original character. The image correcting unit directs the character image stored in the character storing unit to a proper direction in accordance with the detected result of the image status detecting unit. Moreover, the image can be corrected by combining the mirroring and rotation.

In these aspects, document image correcting apparatus may comprise a document image storing unit for storing a document image including a character line which consists of plural characters inputted through the image input unit; and a character image extracting unit for extracting at least one character image from the document image inputted through the input image unit. In this case, the character image storing unit stores the character extracted by the character image extracting unit, and the image correcting unit corrects the document image stored in the document image storing unit to a proper image in a specified direction in accordance with a detected result of the image status detecting unit.

Further, the document image correcting apparatus may comprise a conversion controlling unit for controlling the image converting unit. That is, when the detected result is different from a predetermined result, conversion by the image converting unit is varied, and then the character recognition is tried again based on the varied conversion, whereby capable of recognizing a character speedily.

The conversion procedure detecting unit may detect a rotated angle and/or an existence of mirroring in a case that the recognition rate of the character image obtained by the character recognizing unit becomes maximum among all combinations of rotation and mirroring executed by the image converting unit.

The conversion procedure detecting unit may detect a rotated angle and an existence of mirroring when the recognition rate obtained by the character recognizing means is over a predetermined value.

The conversion controlling unit may control the image converting unit so that the character image is converted in a state that rotation and mirroring are combined in a specified order. For example, priority is given to a direction in which scanning is executed frequently.

The conversion controlling unit may control the image converting unit so that the character image is converted in accordance with only a specified combination of rotation and mirroring among plural combinations of rotated angles and mirroring. A case is assumed in that scanning is executed in only specific directions.

The conversion controlling unit may control the image converting unit so that the character image is converted in order of high frequency among combinations of rotated angles and mirroring which previously direct character images to the proper direction. This function is used to learn a habit of a personal for scanning.

The conversion controlling unit may control the image converting unit so that a character image is rotated every predetermined angle (such as 0°, 90°, 180° and 270° while mirrored.

The image correcting unit does not correct character images not satisfying a specified condition as a result of character recognition as to all character images converted by said image converting means.

The present invention may be an image status detecting method comprising: an image converting step of rotating and/or of mirroring the character image inputted through the image input tool; a character recognizing step of referring a character recognition dictionary storing character feature information and of obtaining candidate characters resemble to the character image mirrored and rotated in the image converting step and a recognition rate indicating resemblance; and a conversion procedure detecting step of detecting, based on the candidate characters and the recognition rate a recognized result in the character recognizing step, a rotation angle and an existence of mirroring needed to direct the original character image to a proper direction.

The present invention may be a document image correcting method comprising: a character image storing step of storing a character image inputted through an image input tool; an image status detecting step of detecting whether or not the character image stored in the character image storing step is mirrored and what degree the character image is rotated compared with an original character; and an image correcting step of making the character image stored in the character image storing step erecting based on a detected result of the image status detecting step.

The present invention may be a computer readable medium storing a program. The program comprises an image converting step of rotating and of mirroring the character image inputted through the image input tool; a character recognizing step of referring a character recognition dictionary storing character feature information and of obtaining candidate characters resemble to the character image mirrored and rotated in the image converting step and a recognition rate indicating resemblance; and a conversion procedure detecting step of detecting, based on the candidate characters and the recognition rate a recognized result in the character recognizing step, a rotation angle and an existence of mirroring needed to direct the original character image to a proper direction.

The present invention may be a computer readable medium storing a program. The program comprises a character image storing step of storing a character image inputted through an image input tool; an image status detecting step of detecting whether or not the character image stored in the character image storing step is mirrored and what degree the character image is rotated compared with an original character; and an image correcting step of making the character image stored in the character image storing step erecting based on a detected result of the image status detecting step.

The third aspect of the present invention is a document image correcting apparatus comprising a character image extracting unit for extracting a character image satisfying a predetermined condition from an inputted document image; and a character direction detecting unit for detecting a rotation and an existence of mirroring as to the character image extracted by the character image extracting unit.

The predetermined condition may be a ratio of a number of black pixels to a number of pixels, a length ratio of a long side to a short side, or at least one of a number of pixels in a lengthwise direction and a number of pixels in a horizontal direction in the character image extracted by the character image extracting unit.

The character image extracting unit, when a character image having a high symmetry appears, does not clip the character image.

The character direction detecting means may apply a character recognition to the character image extracted by the character image extracting unit, and when a candidate character obtained as a result of the character recognition is coincident with a predetermined character, does not detect a direction of the character image.

The fourth aspect of the present invention is a document image correcting apparatus comprising a character image extracting unit for selectively extracting a character image satisfying a predetermined condition from an inputted document image; a character image converting unit for applying a rotation process at a predetermined angle to the character image extracted by the character image extracting unit, for applying the rotation process to the character image after applying a mirroring process, and for outputting the character image to which the rotation process and the mirroring process are applied; a character recognizing means for executing a character recognition as to each direction of the character image outputted from the character image converting unit; and a document direction determining unit for determining a direction of the inputted document image based on a result of the character recognition executed by the character recognizing unit.

In the present invention, the character recognizing unit outputs reliability information indicating an accuracy of the character recognition process as to each direction of the character image outputted from the character image converting unit, and the document direction determining unit determines the direction of the inputted document image based on the reliability information of the character image outputted from said character recognizing unit.

The document direction determining unit may detect a maximum reliability information among the reliability information inputted from said character recognizing means and determines the direction of the inputted document image based on the maximum reliability information.

The document direction determining unit may compare the reliability information inputted from the character recognizing unit with a predetermined threshold, and executes no document direction determination based on the character image when no reliability information exceeds the predetermined threshold as to each direction of the character image. The document direction determining unit may compare the reliability information inputted from the character recognizing unit with a predetermined threshold, and executes no document direction determination based on the character image when a number of reliability information exceeds a predetermined number.

The document direction determining unit may detect directions of characters as to plural character images and determines the direction of the document image based on the directions which are detected.

The document direction determining unit may calculate an average of reliability of each character in each character direction as to plural character images, and determines the direction of the document image based on the average.

The document direction determining unit may determine a character direction obtaining a most number of maximum reliability among character directions having plural maximum reliability of each character image as a document direction.

The document direction determining unit, when maximum reliability are obtained more than a predetermined number as to a character direction, determines the character direction as a document image direction.

The present invention may be document image correcting method comprising: a step of extracting a character image satisfying a predetermined condition from an inputted document image; and a step of judging a rotation and an existence of mirroring as to the character image which is selectively extracted.

The present invention may be a document image correcting method comprising: a step of selectively extracting a character image satisfying a predetermined condition from an inputted document image; a step of applying a rotation process at a predetermined angle to the character image which is selectively extracted and of applying the rotation process to the character image after applying a mirroring process; a step of outputting the character image to which the rotation process and the mirroring process are applied; a step of executing a character recognition as to each direction of the character image which is outputted; and a step of determining a direction of the inputted document image based on a result of the character recognition.

The present invention may be an information storage medium storing a program. The program comprises a step of extracting a character image satisfying a predetermined condition from an inputted document image; and a step of judging a rotation and an existence of mirroring as to the character image which is selectively extracted.

The present invention may be an information storage medium storing a program; said program comprises a step of selectively extracting a character image satisfying a predetermined condition from an inputted document image; a step of applying a rotation process at a predetermined angle to the character image which is selectively extracted and of applying the rotation process to the character image after applying a mirroring process; a step of outputting the character image to which the rotation process and the mirroring process are applied; a step of executing a character recognition as to each direction of the character image which is outputted; and a step of determining a direction of the inputted document image based on a result of the character recognition.

The present invention may be a status detecting apparatus detecting what status a document image inputted through an image input unit is as to a proper direction. The status detecting apparatus comprises a image converting means for producing a rotated image or a mirrored image from the document image inputted through the image input unit; a character recognizing unit for applying a character recognition process to each character included in the rotated image and the mirrored image produced by the image converting unit; and a conversion procedure detecting unit for arranging the document image inputted through the image input unit in the proper direction based on an image direction of which a character recognition rate is highest among the rotated image and the mirrored image as a result of character recognition by the character recognizing unit.

The present invention may be a document image correcting apparatus comprising: an input unit for inputting a document image; a selecting unit for selecting a character image from the document image inputted through the input unit; a judging unit for judging which direction the selected character image is inputted as to a standard direction; and an arranging unit for arranging all of the inputted document image into the standard direction based on the judged direction.

The present invention may be a document image correcting apparatus comprising: an input unit for inputting a document image; a judging unit for judging the inputted document image and an existence of mirroring as to a standard direction; and an applying unit for applying a process including mirroring to the document image based on a direction of the document image which is judged.

The present invention may be a document image correcting method comprising: a step of inputting a character; a step of rotating the inputted character in a plurality directions and of mirroring the character rotated in each direction; a step of executing character recognition as to the rotated and mirrored character; a step of selecting a character of which a recognition rate of the character recognition is highest; and a step of converting the inputted character into a proper direction based on a rotation direction and an existence of mirroring of the selected character.

The above-described elements may be combined in any way.

BRIEF DESCRIPTION OF THE DRAWINGS

Other objects and advantages of the present invention will become apparent during the following discussion conjunction with the accompanying drawings, in which:

FIG. 8 shows relations between a display and erecting directions;

FIG. 9 shows relations between directions of character images and conversion procedures for erecting images;

FIG. 19 is a table showing properties of character images of respective kinds;

FIG. 20 is a view showing a sample of a character image selecting process;

DETAILED DESCRIPTION OF THE PREFERRED EMBODIMENT

Hereinafter, concrete explanations will be given of embodiments according to the present invention with reference to drawings.

Embodiment 1

Figure 1:
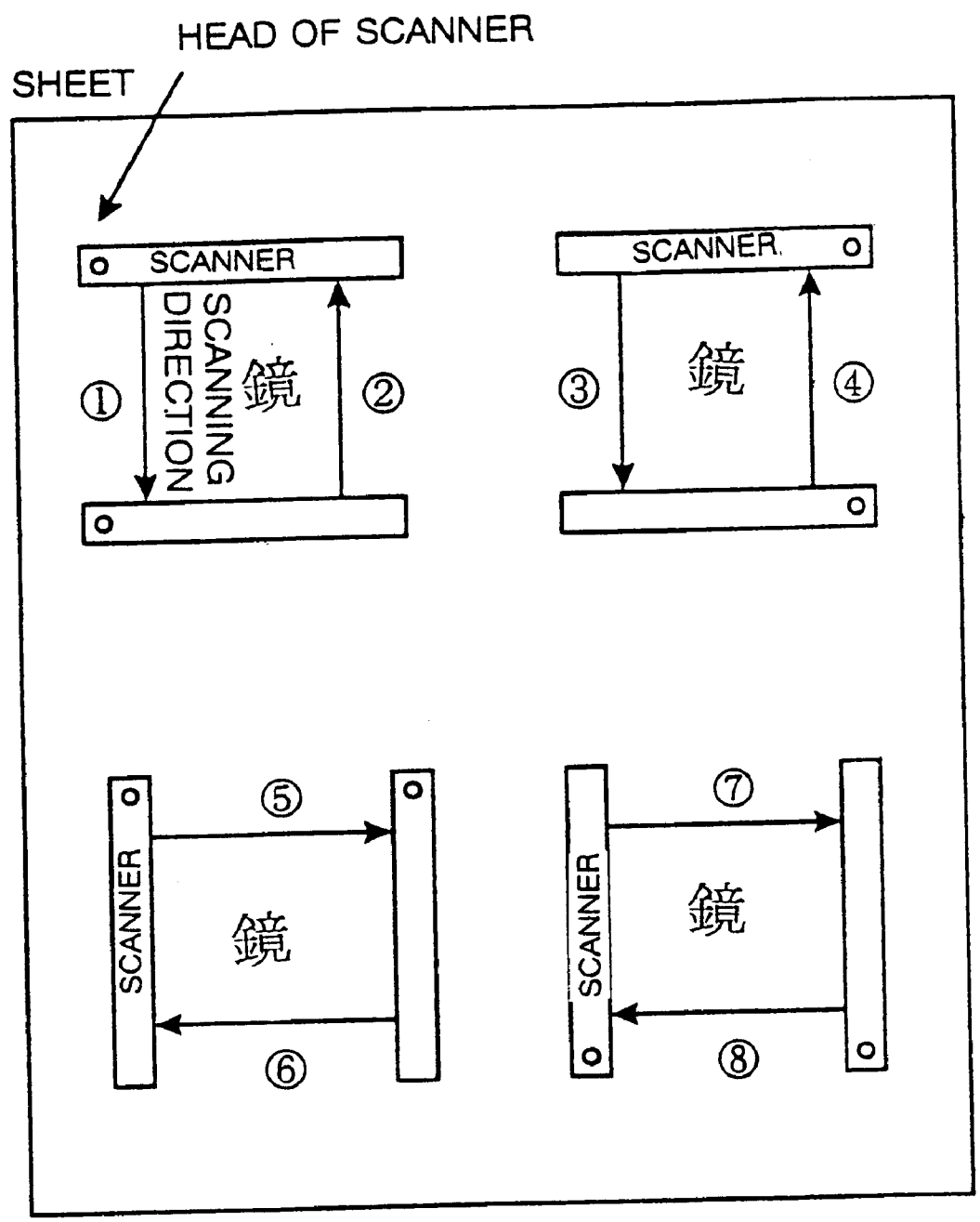
FIG. 1 shows scanning directions by a hand-held scanner.
Figure 2A:
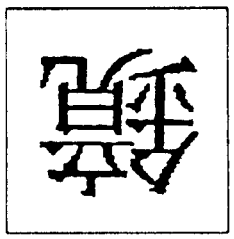
FIGS. 2(a) through 2(h) show images scanned in respective scanning directions.
Figure 2B:
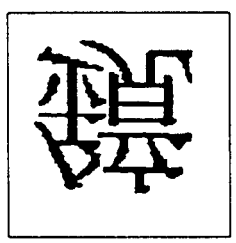
Figure 2C:
Figure 2D:
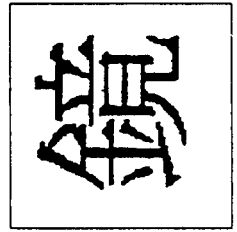
Figure 2E:
Figure 2F:
Figure 2G:
Figure 2H:
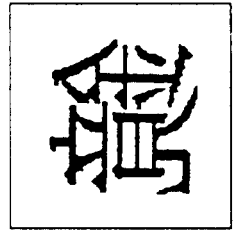

A hand-held scanner used as an image input tool for manual operation scans a sheet in any direction such as from top to bottom and from right to left as shown by ① through ⑧ in FIG. 1. Additionally, characters are written on the sheet lengthwise (vertically).

In FIG. 1, it is assumed that the direction ① is proper for inputting a character, therefore, when the sheet is scanned in directions except ①, an image is read in a status that the image is rotated and mirrored according to the scanning direction. For example, when there is a Chinese character "鏡" erecting in the sheet and the character is scanned in directions ① through ⑧ in FIG. 1, extracted imaged are respectively shown in FIGS. 2① through 2⑧.

Data is read from the head of scanner in a main scanning direction, and data is read/arranged similarly to the moving direction of the scanner in a sub-scanning direction.

In the present invention, it is notable that character recognition rate is low as to rotated characters and mirrored character images, therefore, character images are extracted, a rotated angle at which the recognition rate becomes maximum is detected and/or an existence of mirroring conversion is detected, and rotation and mirroring are applied to an original scanned image to obtain an image which is automatically erect in a correct direction.

Figure 3:
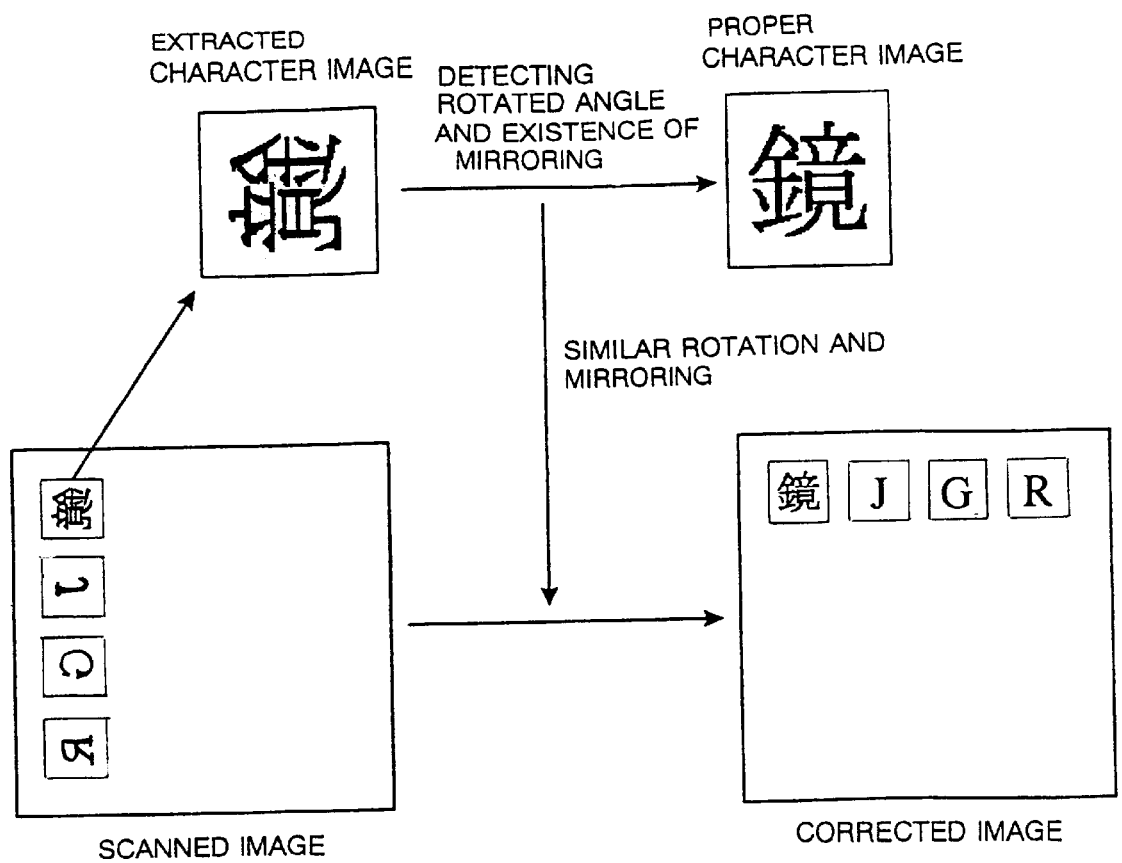
FIG. 3 is a principle view showing a procedure until erecting the image.

FIG. 3 shows a principle of the present invention. According to the present invention, one or more character images (extracted character images) are extracted from the document image (scanned image) scanned with the hand-held scanner, and an rotated angle and an existence of mirroring are detected in order to obtain an erecting character image. Based on detected results, the same conversion, which is applied to the extracted character image to obtain an erecting character image, is also applied to the originally-scanned image, thereby obtaining an erecting image (corrected image) from the rotated and mirrored image.

Incidentally, various kinds of computer such as a PC (personal computer) and a work station may carry out the rotation process and the mirroring process for the inputted character, the character recognition process and the image conversion process into a proper direction. Further, an image scanner may carry out all or a part of these processes.

Now, as to a fixed display (such as a CRT display), the top and bottom of the screen is fixed, therefore, an erecting direction is always fixed. However, as to a display of a portable information processor, there is a case in that images are displayed lengthwise and sideways according to how to use the processor and an orientation of the processor held by hands. In this case, when images taken into the portable information processor are made erecting, the images are made erecting in a predetermined direction.

Figure 4A:
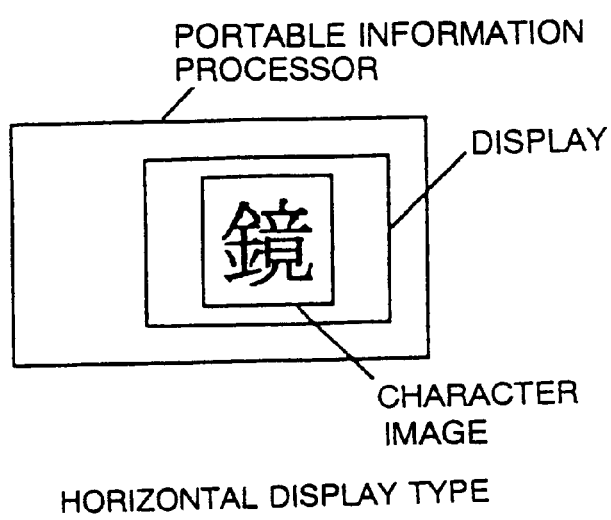
FIGS. 4(a) and 4(b) show erecting images in specified directions.
Figure 4B:
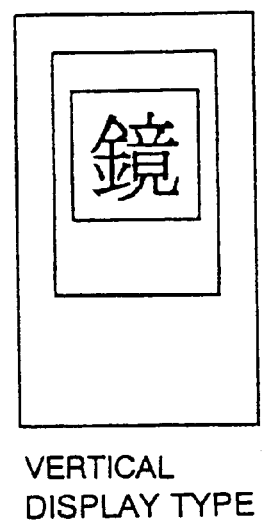

With this operation, as to a portable information processor which displays an image sideways as shown in FIG. 4(*a*), the image is erecting when the processor is arranged sideways, and as to a portable information processor which displays an image lengthwise as shown in FIG. 4(*b*), the image is erecting when the processor is arranged lengthwise, therefore, it is possible to correct images so as to always erect in accordance with the watching direction.

An rotated angle and an existence of mirroring of an character image extracted from the document image are detected by using character recognition as described hereinafter.

Figure 5:
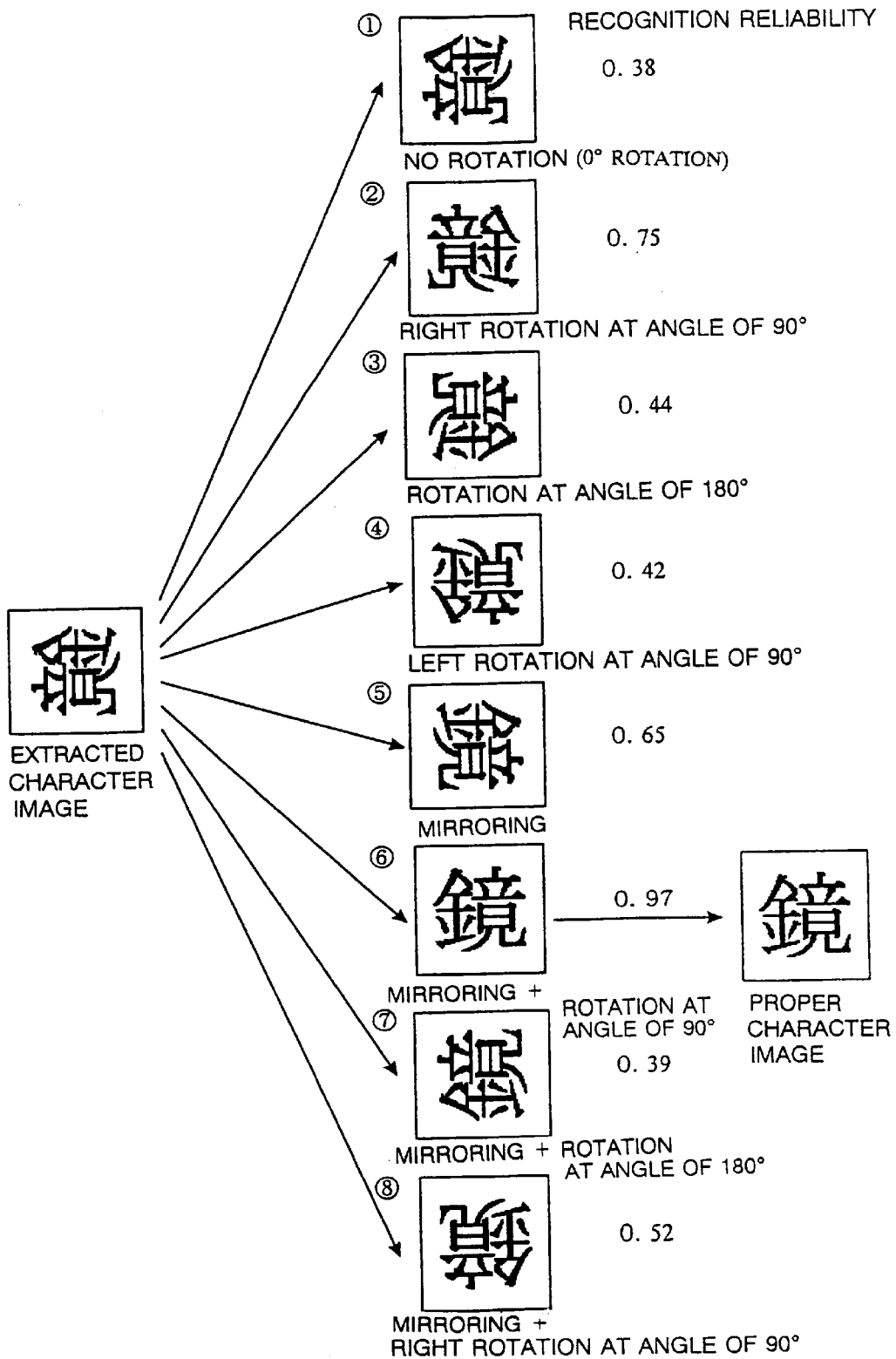
FIG. 5 shows a procedure according to the present invention.

Images obtained by rotating the extracted character image at angles of 90°, 180° and 270° are produced, and images obtained by mirroring the rotated images are produced. For example, in FIG. 5, the character image extracted from the scanned image is rotated and mirrored in order to obtain images indicated by ① through ⑧. The character recognition is respectively carried out for eight kinds of produced images, an image is selected of which the recognition rate is highest or of which the recognition reliability is maximum based on the recognition results, and an rotated angle and an existence of mirroring of the selected image are detected. In FIG. 5, the image ⑥ has the highest recognition rate, and is detected as an image obtained by mirroring the original extracted character image, and then rotating the mirrored image at angle of 90° to the left. The detected rotation and mirroring are applied to the original scanned image, thereby capable of correcting the original scanned image to a proper image.

While the character recognition is applied to extracted images sequentially by combing the rotation and the mirroring, an extracted image is judged as recognized when the recognition rate is over a predetermined value, and then remaining conversions are skipped.

In FIG. 5, in a case that the recognition rate is set to 0.9 for judging that an image is correctly recognized, it is detected that the recognition rate is over 0.9 when the image ⑥ is recognized by sequentially recognizing characters from the image ①. And then, the image ⑥ is judged as an erecting image and the character recognition process is terminated, and recognition for images ⑦,⑧ are skipped, whereby a number of times of conversion/recognition processes become less than a case in that the character recognition is carried out for all directions, and then the processing time is shortened.

Now, when a document image is scanned by manual operation, it is suspected that there are many cases in that the document image is scanned in a direction such as a direction to read a document. A document image may be scanned in any directions as shown in FIG. 1, however, there is a possibility that scanning in the direction ⑤ is carried out with higher frequency than other directions.

So, the order of priority is previously set based on frequencies of scanning directions as the result of multiple times of scanning, and the rotation and the mirroring directing the scanned image to a proper direction are applied to the extracted image which is scanned in order of priority, namely, in order of frequency in use. As a result, it is possible to detect the rotated angle and an existence of mirroring of the extracted character image at an early stage.

As another way, the rotation and the mirroring are applied to the extracted image as to only specific case in that scanning is frequently carried out, thereby reducing processes.

Additionally, scanning directions are influenced by a personal habit. Then, a histogram of scanning directions is accumulated and updated whenever scanning is carried out, and a procedure of the rotation and the mirroring is determined in accordance with the frequency in the histogram, thereby capable of absorbing different habits by diversity of operators and capable of optimizing the correction.

Hereinafter, more detail explanations will be given of the embodiment according to the present with reference to drawings.

Figure 6:
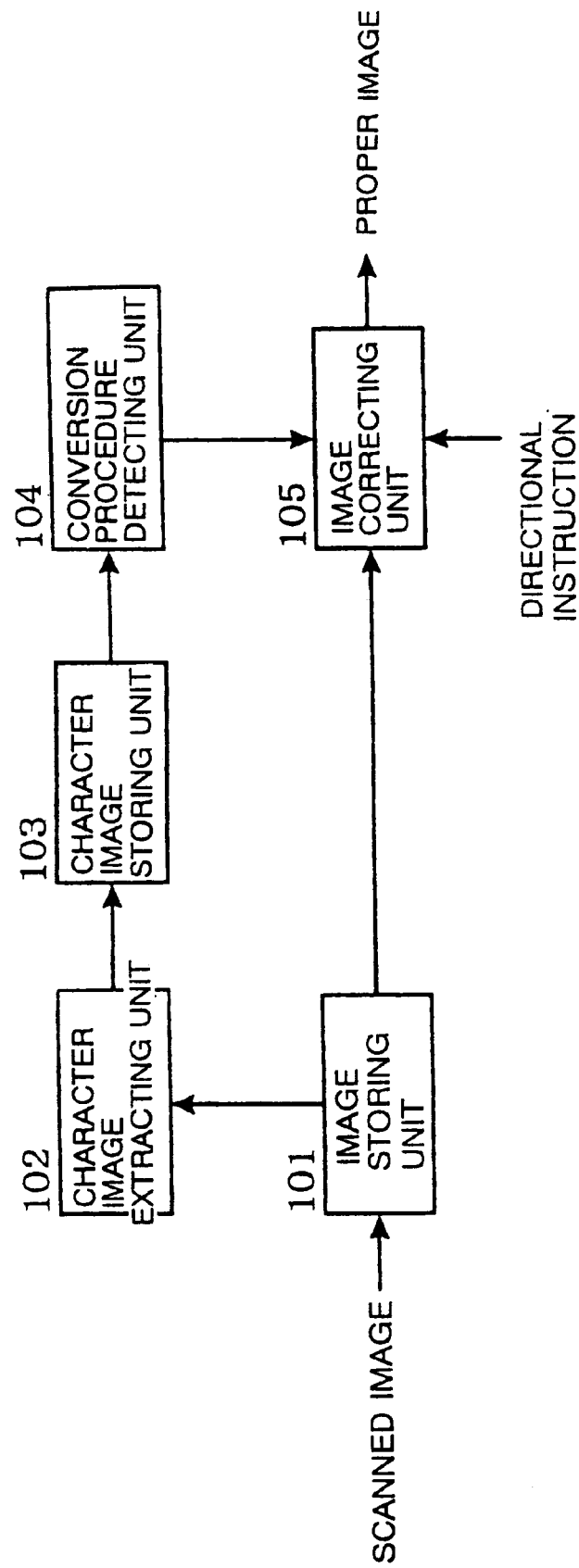
FIG. 6 is a block diagram showing a structure of the first embodiment.

FIG. 6 shows this embodiment according to the present invention, for example a PC (personal computer) and a work station, provided with an image storing unit 101 storing a scanned image, a character image extracting unit 102 extracting a character image from the scanned image every character, a character image storing unit 103 storing a extracted character image, a detecting unit 104 detecting a rotation angle and an existence of mirroring used to make the character image erect, and an image correcting unit 105 correcting the scanned image to an erecting image based on the specified rotation angle and the existence of mirroring.

A document image correcting apparatus operates as follows. An image taken by scanning with the hand-held scanner is stored in the image storing unit 101 as a scanned image after pre-processed such as removing noises on the image and correcting inclination.

The character image extracting unit 102 clips out at least one image of an area determined as a character image from the scanned image stored in the image storing unit 101 every character and stores them in the character image storing unit 103.

The conversion procedure detecting unit 104 detects a rotation angle and an existence of mirroring in order to correct each extracted image into an erecting character image.

The image correcting unit 105 corrects the scanned image stored in the image storing unit 101 to an erecting image based on the result detected by the conversion procedure detecting unit 104. At this time, when a proper direction is instructed from outside in addition to the detected result of the conversion procedure detecting unit 104, the image correcting unit 105 corrects the scanned image into an erecting image in an instructed direction so as to output it.

As above described, the scanned image is automatically corrected in an erecting direction.

Figure 7:
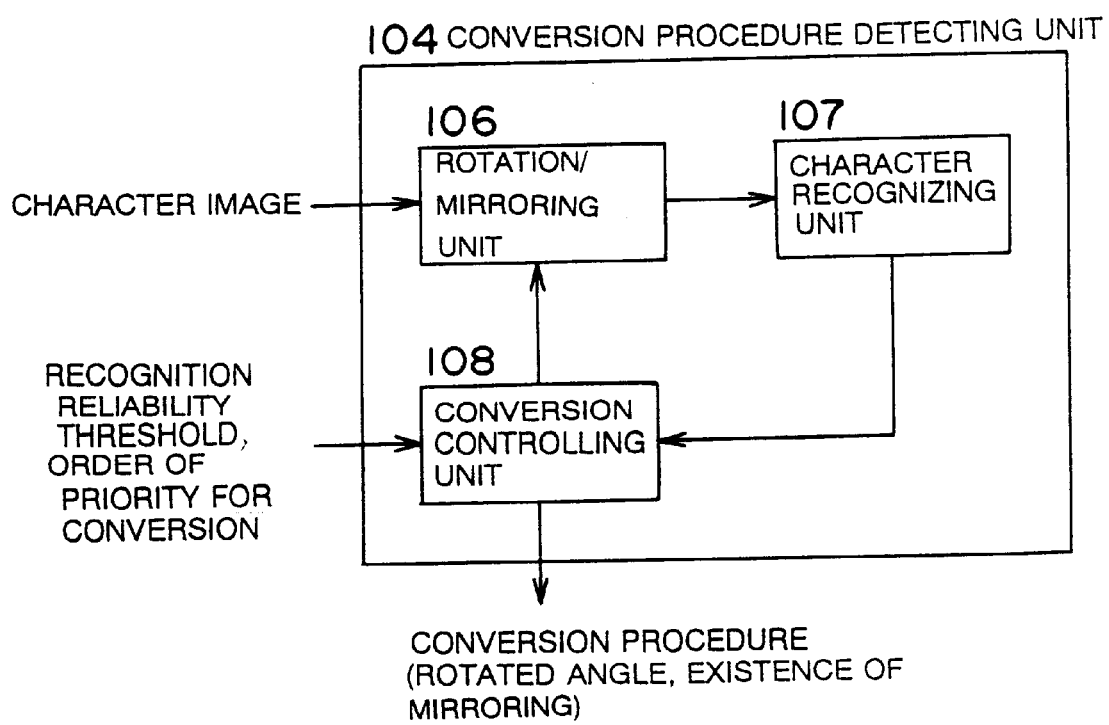
FIG. 7 is a block diagram showing a structure of a conversion procedure detecting unit.
Figure 10B:
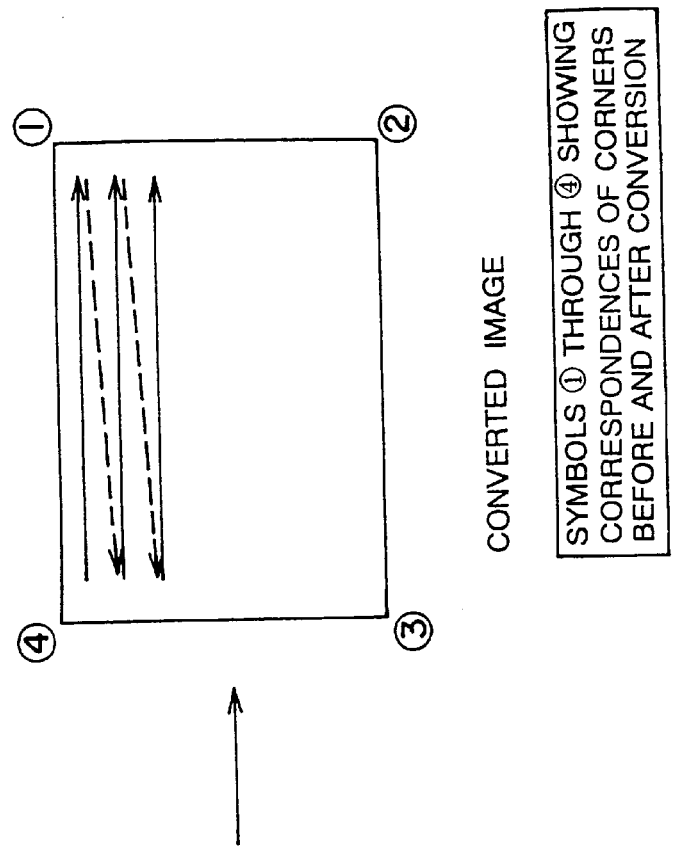
FIG. 10(a) shows an inputted image of an image conversion sample 1 and FIG. 10(b) shows an converted image of the image conversion sample 1.
Figure 10A:
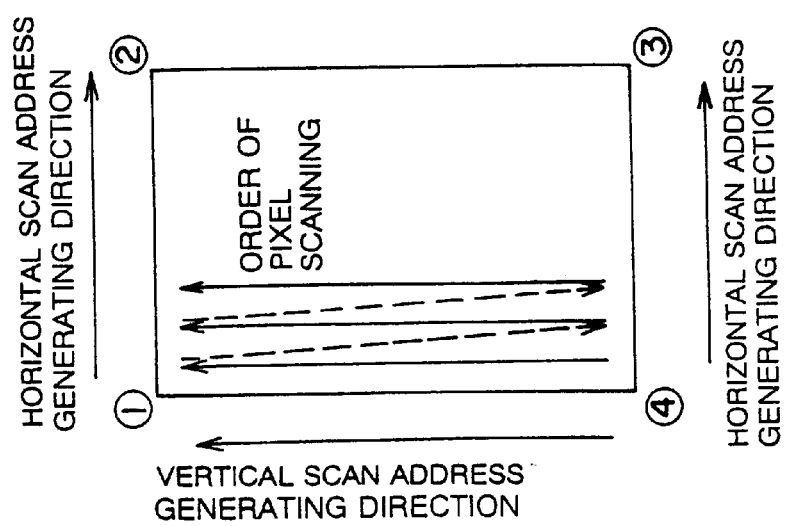
Figure 11A:
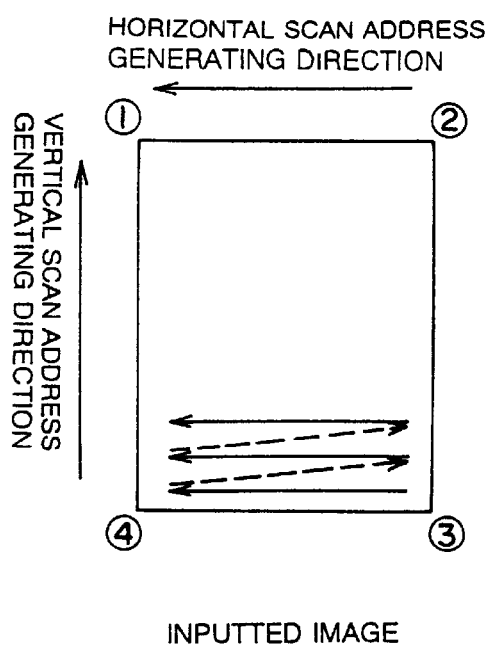
FIG. 11(a) shows an inputted image of an image conversion sample 2 and FIG. 11(b) shows an converted image of the image conversion sample 2.
Figure 11B:
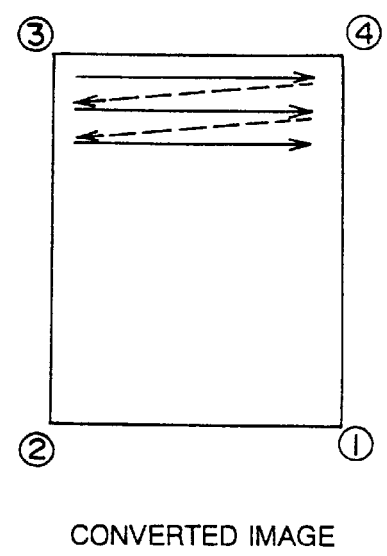
Figure 12A:
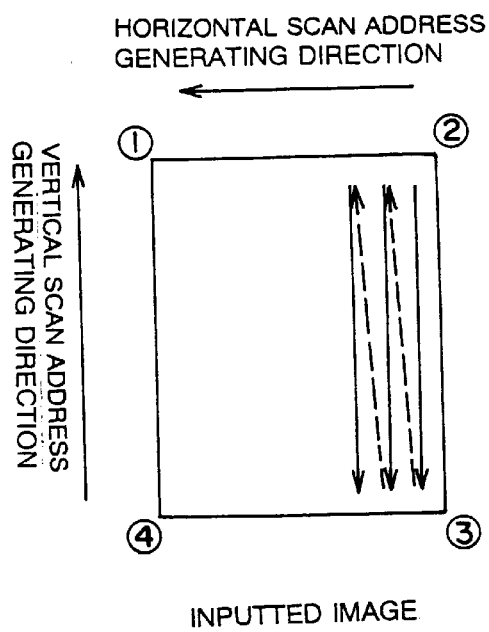
FIG. 12(a) shows an inputted image of an image conversion sample 3 and FIG. 12(b) shows an converted image of the image conversion sample 3.
Figure 12B:
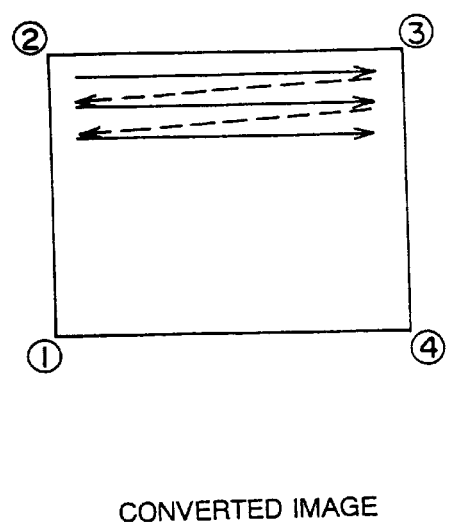
Figure 13A:
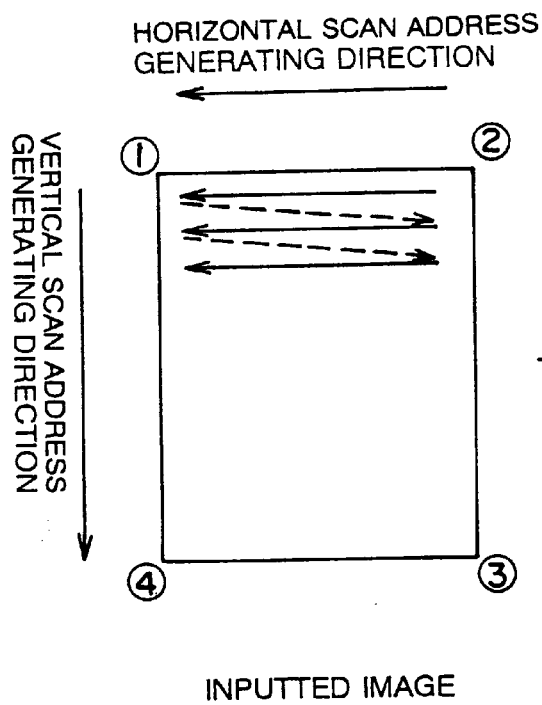
FIG. 13(a) shows an inputted image of an image conversion sample 4 and FIG. 13(b) shows an converted image of the image conversion sample 4.
Figure 13B:
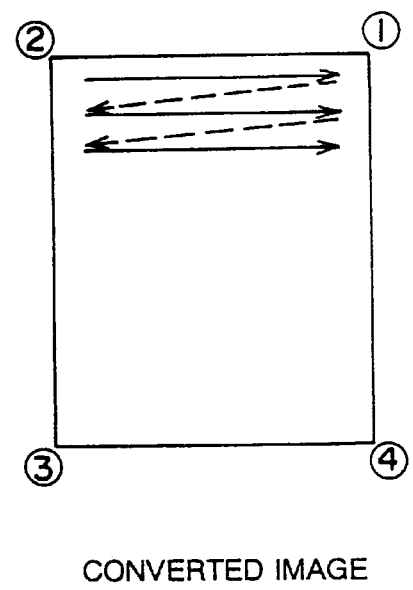
Figure 14A:
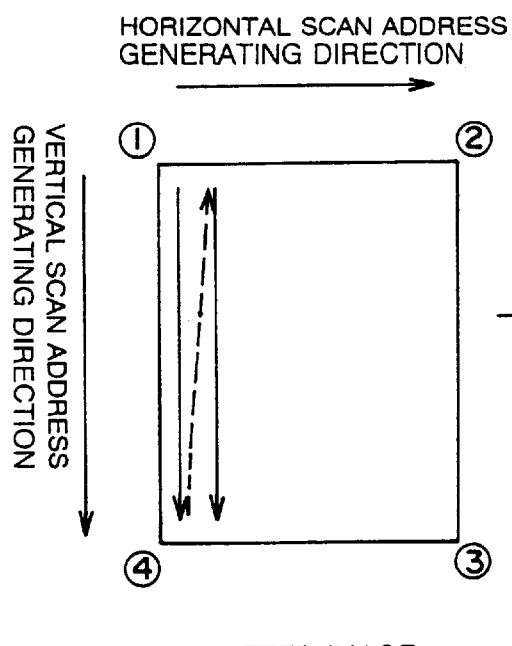
FIG. 14(a) shows an inputted image of an image conversion sample 5 and FIG. 14(b) shows an converted image of the image conversion sample 5.
Figure 14B:
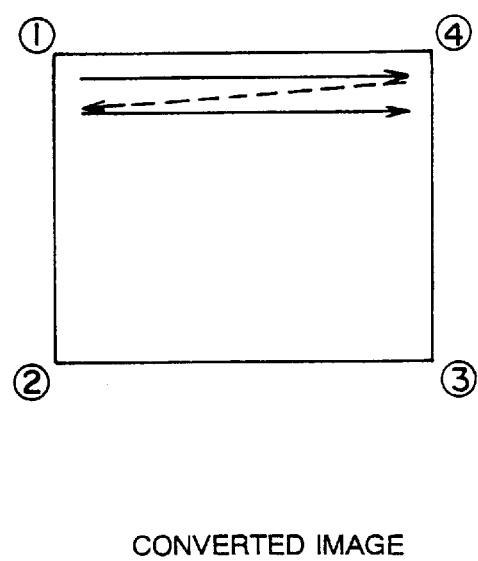
Figure 15A:
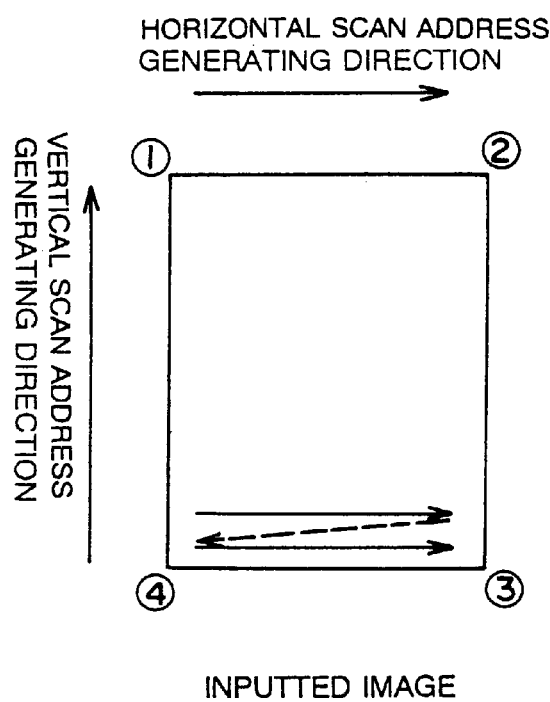
FIG. 15(a) shows an inputted image of an image conversion sample 6 and FIG. 15(b) shows an converted image of the image conversion sample 6.
Figure 15B:
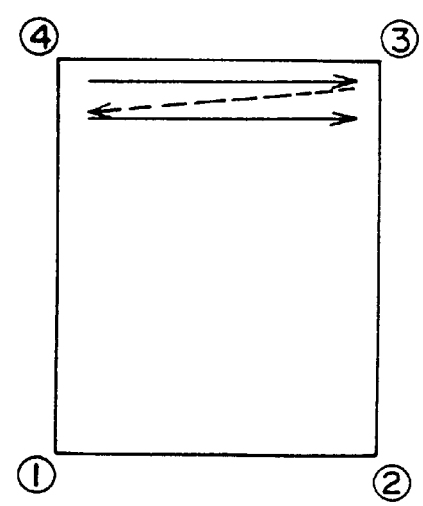

FIG. 7 shows an embodiment of the conversion procedure detecting unit 104 provided with a rotating-mirroring unit 106 rotating and mirroring the extracted character image in accordance with an instruction, a character recognizing unit 107 recognizing a rotated-mirrored character image and outputting a recognition reliability such as a recognition rate, and a conversion controlling unit 108 controlling rotation/mirroring based on the result of character recognition and detecting a rotation angle and an existence of mirroring concerning the highest recognition rate. Here, explanations will be given of a case in that the character recognizing unit 107 outputs a recognition accuracy as the recognition reliability.

The character image extracted from the scanned image is inputted into the rotating-mirroring unit 106. The conversion controlling unit 108 controls the rotating-mirroring unit 106 so that, as shown in FIG. 5, images rotating by every angle of 90° and images obtained by mirroring the rotated images are sequentially produced (converted) from an inputted character image. The character recognizing unit 107 recognizes the converted character images and informs the conversion controlling unit 108 of recognition accuracies.

The conversion controlling unit 108, based on the recognition accuracies informed from the character recognition unit 107, detects a rotation angle and an existence of mirroring of the highest recognition accuracy among all conversion procedures instructed to the rotating-mirroring unit 106 and outputs a conversion procedure. For example, in FIG. 5, it is detected that the recognition accuracy of the image ⑥ is detected as high among images ① through ⑧, and "mirroring+left rotating by an angle of 90°" is detected as a conversion procedure.

Additionally, when the recognition accuracy is over a specified threshold value, the conversion controlling unit 108 may terminate the conversion procedure detecting process after outputting the rotation angle and the existence of mirroring at that time. For example, in FIG. 5 when a threshold is set over 0.9 and processes are sequentially carried out from ① to ⑧, the process is finished when the image ⑥ is obtained and the processes ⑦ and ⑧ are skipped.

The conversion controlling unit 106 may previously receive a converting order as an order of priority, and may control the rotation and the mirroring in accordance with the order of priority. For example, in FIG. 5, when the order of priority is ④, ⑦, ⑥, ②, ①, ⑧, ⑤, ③, an erecting image ⑥ is obtained at a time which three times of conversions and character recognition are carried out, whereby the following conversions can be skipped.

As another way, in the conversion controlling unit 108, detected conversion procedures are accumulated in a histogram, and the conversion controlling unit 108 controls the rotating-mirroring unit 106 so as to carry out conversion in order of frequency. In this way, the detected conversion procedure is fed back, whereby it is possible to detect a conversion procedure efficiently by reflecting a condition such as a habit of an operator who scans. For example, when the sheet is scanned in the direction ⑤ in FIG. 1, the scanned character image is shown in FIG. 5 as "extracted character image". And then, the histogram is updated, namely, "mirroring+left rotating at an angle of 90°" is increased. When the scanning in the direction ⑤ in FIG. 1 is repeated, the frequency of "mirroring+left rotating at an angle of 90°" is increased, whereby the conversion is used in accordance with the frequency by giving priority.

As above described, the rotation angle and the existence of mirroring of the character image extracted from the scanned image are detected.

In this way, the rotation angle and the existence of mirroring of the character image in the scanned image are detected, and rotation angle and the mirroring similar to those detected as to the character image are applied to the scanned image, whereby it is possible to obtain an erecting image automatically from a scanned image though the image is scanned in any direction such as from top to bottom or from right to left.

<Character Recognition Process>

The explanations are given of the embodiment 1 as above described. The present invention uses a technique of the character recognition process. Then, a sample of the character recognition process used in the present invention will be explained simply.

Hereinafter, descriptions will be given of the technique disclosed in "Hiroshi, Kamata et al. Singakugiho TECHNICAL REPORT OF IEICE PR MU-25 (1997-03)" published by Institute of Electronics and Communication Engineers of Japan (IECE).

According to this technique, candidate characters as a recognition result are obtained with a small quantity of compressed character features at high speed, and then a character is recognized with a large quantity of character features accurately. This technique includes a character extracting process and a character recognizing process.

The character extracting process is a process extracting an image of one character from a binary image which is a text document. This process is a bottom-up process integrating pixels to constitute a character successively, and is carried out in accordance with the following procedure.

First, as a basic element of a character, connected areas of black pixels are extracted. Then, a circumscribed rectangle of plural connected areas in which circumscribed rectangles are overlapped is obtained, and the positional relation of them is analyzed, thereby determining a direction of a line and extracting a line to extract a position. Further, circumscribed rectangles orthogonal to the line are regarded as a group, rectangular integration in a direction orthogonal to the line is carried out in order to obtain circumscribed rectangles of the group, and these circumscribed rectangles are integrated in the direction of the line, thereby recognizing them as a character and taking a circumscribed rectangle of the integrated portion as a character circumscribed rectangle.

This character circumscribed rectangle is used as a standard, and a width position of a vertical character frame is determined based on the line directional position of the character circumscribed rectangular which is adjacent in the line.

In addition to the above-described main process of the character extracting process, this technique also carries out a process to remove elements except for characters such as a noise and to separate plural characters being contact with each other.

Then, the character recognition process accepts the image of one character extracted in the character extracting process and recognizes the character. The character recognition process is carried out in accordance with the following procedure.

(1) Normalization

According to this procedure, the image of one character extracted from a virtual character frame in the character extracting process is changed into a normalized image 48 pixels (length)×48 pixels (breadth). When the length and breadth of the image of this one character exceeds 48 pixels, the image is reduced equally, and when the length and breadth of the image of this one character is ¾ of the normalized image, the image is magnified so that the maximum side fits the virtual character frame.

(2) Feature Extraction

A character feature is extracted from the normalized character image. This character recognition takes a border variation in an area obtained by variably dividing the character area so that a number of border points is constant, as a variable divided border directional feature.

In other words, after extracting border points, the character circumscribed rectangle is divided into partial areas so that a number of border points is constant, and a directional feature volume is obtained concerning the character border in the lengthwise direction in the partial rectangle area. Then, the feature quantity in the partial rectangle area is shaded off between part rectangle areas adjacent to each other concerning the short side of the area rectangle, thereby obtaining a final character feature quantity.

(3) Feature Compression

In this procedure, the character feature extracted in the feature extraction process is compressed into a compressed feature of a few dimensions. The feature compression process includes two steps, which are a process extracting an initial compression feature coordinate axes in order to obtain a few initial coordinate axes easy to separate distributions of character features and a process calculating a compression feature by taking an original feature coordinate as the compression feature concerning a coordinate axis obtained by orthogonlizing the initial coordinate axis.

(3) Rough Classification

In this procedure, a recognition candidate character is obtained using the compression feature obtained in the feature compression process. The rough classification process uses an accuracy-assured high-speed classification and a classification by distance calculation.

According to the accuracy-assured high-speed classification, detailed-classified character features are projected in a rough classification feature space, characters possible to be projected are stored in a candidate character table, and then candidate characters are searched.

However, in this procedure, detailed-classified character features are directly projected in the rough classification feature space instead of a divided area, and a margin is added to the projected distribution in order to magnify it with the character feature for character pattern detailed classification for producing a recognition dictionary.

The classification by the distance calculation is used only in a case that a number of candidate characters by the recognition result is not less than 70.

(5) Detailed Identification

In this procedure, concerning recognized candidate characters outputted in the rough classification process, distances are calculated between an inputted character and an original character feature in the recognition dictionary and are sorted, and then a candidate character of the minimum distance is taken as the recognized result.

<Sample of Hand-held Scanner>

The hand-held scanner as an image input tool, not shown, is provided with an image reading unit optically reading an image on a medium to be read such as a sheet of paper and converting the image into an analog signal, a moving quantity measuring unit measuring a moving quantity of the image reading unit on the medium to be read, an image signal processing unit processing the analog signal outputted from the image reading unit, a read controlling unit driving and controlling the image reading unit in accordance with the moving quantity of the moving quantity measuring unit and an interface unit outputting read data to an external information processor.

The image reading unit reads an image in contact with the medium to be read by using a line sensor, a light source (LED or cold cathode tube) and an optical lens. The light source is lighted during reading, and the line sensor starts reading with a starting signal, thereby converting reflected light quantity at each position of the sensor and outputting it as an analog signal.

The moving quantity measuring unit converts the moving quantity on the medium to be read into a pulse signal with an encoder and outputs it. The image signal processing unit digitizes the picture signal from the image reading unit with an A/D converting circuit, and also carries out image processing such as binarization when needed.

The read controlling unit controls all of reading and transfers data to the information processor. Stating signals are always produced while reading, and line data to which image processing is already applied is stored in an inside buffer. When the moving pulse from the moving quantity measuring unit is detected, the image-processed line data stored in the buffer of a line to be a subject is transferred to the information processor with interruption operation. When two or more moving pulses are detected in one driving cycle of the line sensor, the scanner moves over the reading capacity of the scanner, therefore, only one data is transmitted. When no moving pulse is detected in one driving cycle of the line sensor, the scanner dose not move, therefore, the image-processed line data stored in the buffer is discarded, and the next line data is stored.

The interface unit acts as an electric interface to the information processor, and executes interruption and data access. The data transmitted to the information processor is displayed by the display unit of the information processor, therefore, image data in the read data can be confirmed.

The data is transferred to the information processor every line. Additionally, it is possible to make a capacity of the buffer in the read controlling unit large, in order to transfer a plurality of line data to the information processor together.

<Another Sample of Process>

Next, and explanation will be given of a transformation in that a document image is converted into an erecting image in correspondence to a rotated angle and an existence of mirroring detected from a character image.

The image correcting unit 105 converts a document image into an erecting image based on the directional detected result detected by the conversion procedure detecting unit 104, namely, the rotated angle and the existence of mirroring of the character image and an instruction of an erecting direction from outside. Hereinafter, explanations will be given of a converting procedure into an erecting image and an executing procedure.

First, an explanation will be given of a relation between the directional detected result and the erecting directional instruction, and the procedure converting into an erecting image.

Relations between erecting directions and the display displaying an image are defined as respective erecting directions 1 through 4 as to the direction of the display as shown in FIG. 8.

Based on a rotated angle, an existence of mirroring and the erecting directions 1 through 4 instructed from outside, a converting procedure converting a document image into an erecting image is directly determined as shown in FIG. 9.

Symbols A through G in FIG. 9 respectively represent converting procedures, and respective converting procedure are shown in FIGS. 10 through 16. Conversion procedures A through G are equivalent to the following conversion for an input image.

A: Rotation at an angle of 90°
B: Rotation at an angle of 180°
C: Rotation at an angle of 270°
D: Right and left mirroring
E: Rotation at an angle of 90°+right and left mirroring
F: Rotation at an angle of 180°+right and left mirroring
G: Rotation at an angle of 270 degrees+right and left mirroring Incidentally, no conversion is necessary when the direction of the input image is equal to the proper direction.

Figure 17:
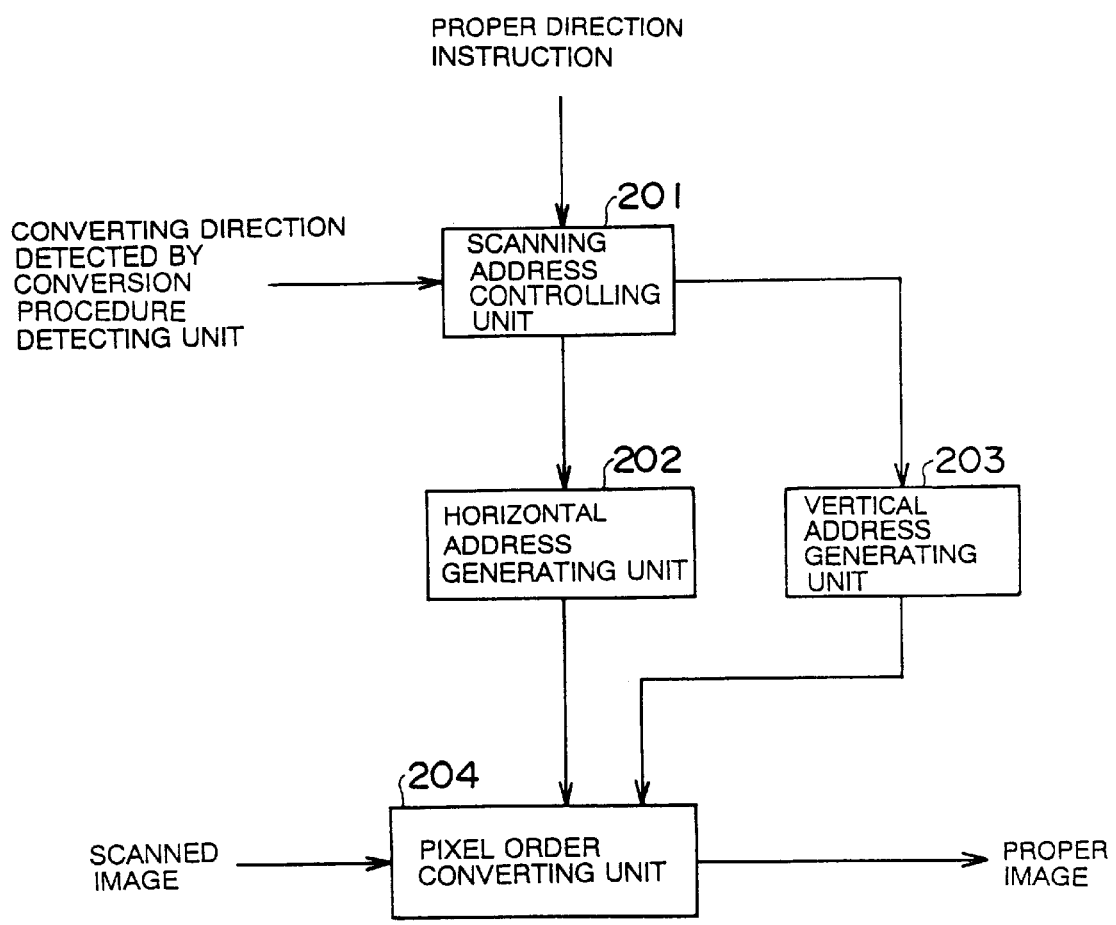
FIG. 17 is a block diagram showing detail of an image correcting unit.

Next, an explanation will be given of the converting procedure from scanned document image into an erecting image with a sample of the image correcting unit 105 shown in FIG. 17.

The image correcting unit 105 is provided with a scan address controlling unit 201, a horizontal scan address generating unit 202, a vertical scan address generating unit 203, and a pixel order converting unit 204.

The scan address controlling unit 201 determines a converting procedure making the document image erecting based on the detected result of the converting procedure detecting unit 104 and the erecting directional instruction, and controls the horizontal scan address generating unit 202 and the vertical scan address generating unit 203 so as to carry out this conversion.

The horizontal scan address generating unit 202 generates a scan address to scan the image from right to left or from left to right every pixel in accordance with the instruction from the scan address controlling unit 201.

The vertical scan address generating unit 203 generates a scan address to scan the image from top to bottom or from bottom to top every pixel in accordance with the instruction from the scan address controlling unit 201.

The pixel order converting unit 204 scans the inputted image every pixel in accordance with the scan addresses generated in the horizontal scan address generating unit 202 and the vertical scan address generating unit 203, and the image of which the pixel order is converted is outputted.

Next, an action of the image correcting unit 105 is explained with a concrete sample.

As an example, an explanation will be given of a case in that the converting procedure detecting unit 104 detects "rotated angle=90° and existing mirroring", and instructs "proper direction 3" as the erecting direction.

In this example, the scan address controlling unit 201 selects "converting procedure G" (FIG. 16) based on the relation shown in FIG. 9 as a converting method. Then, the scan address controlling unit 201, as indicated by arrows at the outside of the inputted image shown in FIG. 16(a), instructs the horizontal scan address generating unit 202 to generate a scan address from right to left, and instructs the vertical scan address generating unit 203 to generate a scan address from bottom to top, simultaneously. At this time, the scan address controlling unit 201, as indicated by arrows at the inside of the inputted image in FIG. 16(a), controls timing of address generation in order to scan all pixels.

The horizontal address generating unit 202 generates an address to scan the image from right to left every pixel in accordance with the instruction of the scan address controlling unit 201.

Similarly, the vertical scan address generating unit 203 also generates an address scanning the image from bottom to top every pixel in accordance with the instruction of the scan address controlling unit 201.

Figure 16A:
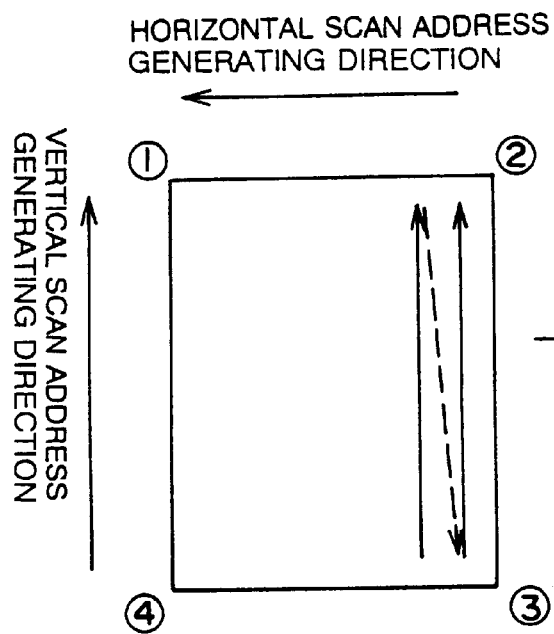
FIG. 16(a) shows an inputted image of an image conversion sample 7 and FIG. 16(b) shows an converted image of the image conversion sample 7.

The pixel order converting unit 204 reads the pixel indicated by the scan addresses generated by the horizontal scan address generating unit 202 and the vertical scan address generating unit 203 from the input image shown in FIG. 16(a), and outputs it.

Figure 16B:
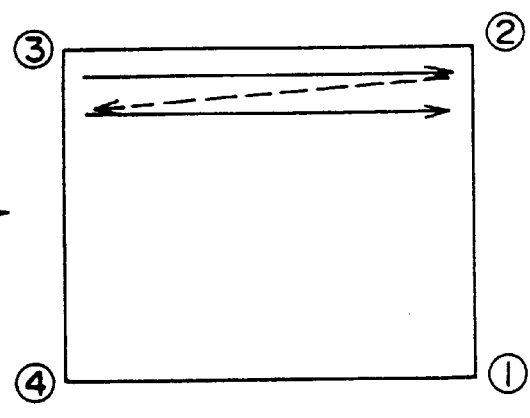

With the above-mentioned action, the input image shown in FIG. 16(a) is converted into the image shown in FIG. 16(b). The Relation between the input image and the converted image is indicated by symbols ① through ④. It is possible to convert an document image into an erecting image in the same way as to another combination of a detected direction and an erecting direction. As above described, according to the present invention, an inputted document image can be converted into an erecting image based on a rotated angle and an existence of mirroring detected from a character image.

According to the document image correcting apparatus of the present invention, a character image is extracted out from a scanned image, at least an existence of mirroring is detected within a rotated angle and mirroring, the scanned image is automatically corrected to a proper image based on the detected result. Thus, though an image is scanned with a hand-held scanner in any direction such as from top to bottom or from right to left, an erecting image can be always obtained, thereby improving an operational convenience and an user interface.

Embodiment 2

Figure 18:
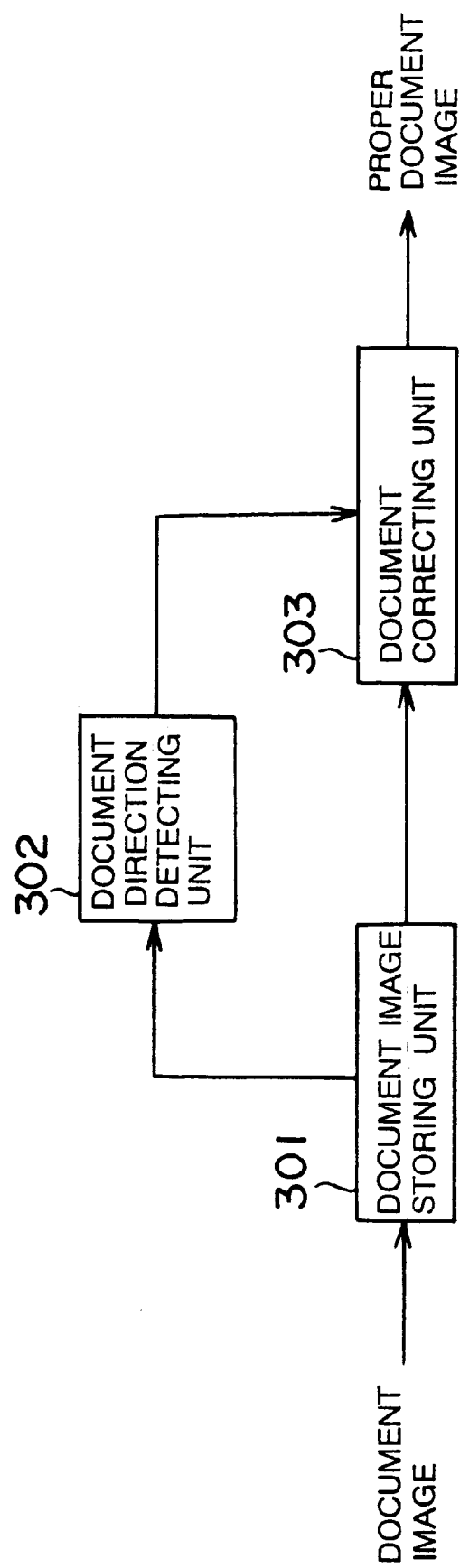
FIG. 18 is a block diagram showing a document image correcting apparatus according to the second embodiment of the present invention.

FIG. 18 is a block diagram showing a main part of a document image correcting apparatus according to the second embodiment of the present invention. In the second embodiment, a character used to judge the rotation/the existence of mirroring in the document image is extracted in accordance with specific conditions, whereby specific the document image is corrected effectively.

As shown in FIG. 18, the document image correcting apparatus is provided with a document image storing unit 301 temporarily storing document images inputted through a not-shown input tool such as a scanner, a document direction detecting unit 302 detecting rotation/mirroring directions of the inputted document, and an image correcting unit 303 applying an erecting process to the inputted document image based on the document direction detected by the document direction detecting unit 302. With this document image correcting apparatus, the image correcting unit 303 outputs an erectly corrected document image.

As explained in the embodiment 1, FIGS. 2(a) through 2(h) show inputted character images by scanning. These are character images obtained by scanning a Chinese Character "鏡". These are character images rotated at 0°, 90°, 180°, 270° compared with an erecting image and respectively mirrored. In this embodiment, the character recognition process is applied to the 8 directions, and the rotation direction and an existence of mirroring are judged.

According to a kind of a character, there are a character of which a rotation and an existence of mirroring are easily judged, and a character image of which a rotation and an existence of mirroring are not easily judged. This difference produces an effect on the recognition rate of the character recognition. For example, as to Hiragana Characters and Katakana Characters, the character recognition rate becomes low, however, as to Chinese Characters, the character recognition rate becomes high. Though it is tried to judge the existence of rotation/mirroring by using Hiragana Characters or Katakana Characters, the character recognition rate is low. As a result, an accuracy for direction detection becomes low. Then, in this embodiment, a character of which the recognition rate is high (such as a Chinese character) is selected from the document, and the rotation/mirroring is detected by using this selected character.

FIG. 19 shows a black pixel ratio, a long-side to short-side ratio and a reliability in a extracted character area for each character such as Chinese Character, Hiragana Character, Katakana Character, alphanumeric, and symbol. Each value shown in FIG. 19 shows an average for each character. Here, the black pixel ratio shows a ratio of black pixels to all pixels. The long-side to shorter-side ratio shows a value obtained by dividing the length of the long side by the length of the shorter side in the extracted character area. The reliability shows an accuracy of the character recognition, and as the value is high as the character recognition rate is high.

As shown In FIG. 19, it is understood that a Chinese character has the highest reliability among five kinds of characters. Other characters have relatively low reliability compared with a Chinese character. Therefore, it is desirable to use Chinese character in order to judge the rotation/the existence of mirroring.

The value shown in FIG. 19 is an average, therefore, as to about a half of Chinese characters, the black pixel ratio exceeds 27%. And, as to about a half of Chinese characters, the long-side to short-side ratio is 1.04 or less. In other words, when characters satisfying a condition that the black pixel ratio is 27% or more and the long-side to short-side ratio is 1.04 or less are selected, a half of Chinese characters can be selected.

Now, a consideration is given to other characters. For example, as to Hiragana characters, the average of black pixel ratios is 16%, and this average is lower than the average 27% of Chinese characters. Then, this value is the average, therefore, it is understood that at least a half of Hiragana characters have black pixel ratios 16% or less. On the other hand, as to a half of Hiragana characters, black pixel ratios exceed 16%, however, there is little possibility in that the black pixel ratios exceeds 27% because of the nature of Hiragana character though it is influenced by a kind of font, namely, the possibility is substantially zero. That goes for Katakana characters, too. Accordingly, it is possible to select a half of Chinese characters based on whether black pixel ratio exceeds 27% or not, and it is possible to increase Chinese characters as candidates to be selected compared with Kana characters.

Then, as to alphanumeric and symbol, averages of black pixel ratios are about 28%. When a consideration is given to errors while reading, it is expected that it is difficult to distinguish between alphanumeric and symbol only based on black pixel ratios. However, alphanumeric and various symbols tend to become lengthwise compared with Chinese characters of which shapes are almost perfect squares. This tendency is shown by the long-side to short-side ratio in FIG. 19. It is possible to consider that there is little case that the long-side to short-side ratio is less than 1.04 concerning alphanumeric and so on. Then, by adding the long-side to short-side ratio to the black pixel ratio, a half of Chinese characters are selected, however, alphanumeric or symbol is hardly selected.

Further, while extracting characters, there is a case in that plural character is misunderstood as one character image and extracted, and there is a case in that portions (left-side portion, right-side portion and so on) of a Chinese character are misunderstood as separated character images and extracted. In these cases, it is expected that the ratio of long-side to short-side is different from usual Chinese character. Thus, the long-side to short-side ratio is used in order to exclude these misunderstood characters.

In this way, it is judged whether each character is selected or not based on the condition shown in FIG. 19, whereby it is possible to extract Chinese characters efficiently.

FIG. 20 shows each black pixel ratio, long-side to short-side ratio and pixel size of each extracted character in a part of a sentence and a character selection condition. The character selection condition prescribes that the black pixel ratio is 25% or more and 60% or less and the long-side to short-side ratio is 1.10 or less in counting on errors for both ratios. Further, as to the pixel size, it is prescribed that the extracted area includes 30×30 pixels or more.

Here, it is assumed that characters in the document is written in Mincho typeface, a reading resolution is 400 dpi and a character size is set to 6 points or more. Incidentally, each value shown in FIG. 20 is nothing but an example.

The character size is set to 30×30 pixels or more, since the character size influences an accuracy of character recognition. Generally, there is a possibility in that the accuracy of character recognition lowers when a very small character is scanned. In this embodiment, Chinese characters expected to have high accuracy of character recognition are selected, and it is not wise to select a character of which the size is small since the recognition rate is low.

In a general document, characters between 6 points and 20 points are used frequently in experience. Thus, it is very advantageous to detect characters of 6 points or more. In this embodiment, 30×30 pixels are equivalent to 6 points, since the character size is obtained by "character size=point number×resolution÷72". When the point number is set to 6 points and the resolution is set to 400 dpi, the character size is shown by "6×400÷72=33.333 . . . ", therefore, the character size is considered as roughly 30×30 pixels.

In addition, no upper limit of the pixel size is particularly set in the case shown in FIG. 4, however, it is not possible to deny a possibility in that a part of a drawing is extracted as a very big character. In this case, since the character recognition is not completed for a extracted "character", it may be possible to set an upper limit of the character size and not to select a drawing when the drawing is extracted as a character. As above described, it is considered that the size of 20 points is considered as an upper limit of the character size used in the document, therefore, a number of pixels corresponding to 20 points may be set as the upper limit of the character size.

Further, there is a case that the reading resolution varies with a scanner, and there is an apparatus capable of setting plural resolutions in accordance with kinds of scanners. In this case, though characters of the same size are read, pixel sizes in the character area very vary. In brief, when resolution becomes two times, numbers of pixels of the lengthwise direction/sideways direction of the character image become 2 times. Therefore, it becomes important to change the extracting size of the character image in accordance with the resolution of the scanner.

When a character is read with a scanner, a reading resolution is previously set, therefore, it is possible to use this reading resolution in order to set a size of a character image according to the reading resolution. It is possible to calculate a pixel size based on the character size and the resolution, therefore, after setting a resolution for reading, an upper limit/a lower limit of the pixel size may be calculated based on the character size and the set resolution. Further, a table showing a relation between the resolution and the character size is previously set in the apparatus, whereby it is possible to read a pixel size from the table and to set the pixel size.

Now, various symbols or graphics exist in a document in addition to general characters. Concerning a word-processors and the like, symbols such as black-colored square and circle are usually used, and there is a case in that a photograph and a drawing exist in the document. There is a case in that a character is black-compressed under circumstances of printing. As to such a character, though the character recognition is carried out, it may be impossible or difficult to detect a direction.

Concerning these black-colored symbols and compressed characters, there are many cases in that the black pixel ratio is very high compared with an usual character, therefore, it is important not to select these symbols and characters. Then, in this embodiment, an upper limit is also set in addition to the lower limit of the black pixel rate. As a result, it is possible to exclude too black "character" from selection objects. When using only the condition such as the long-side to short-side ratio, the pixel size and the lower limit of the black pixel rate, there is a possibility in that these "characters" satisfy this condition, therefore, it is very effective to set an upper limit of the black pixel ratio.

Further, there are cases in that the deepness of the document image is generally uneven, in that document image is generally light and in that document image is generally deep. When the range of the black pixel ratio is set similarly to that shown in FIG. 20, there is a possibility in that the following problems occur.

When the document image is generally deep, it is expected to generally raise the average of the black pixel ratio for each kind of characters shown in FIG. 19. In the case shown in FIG. 4, the black pixel ratio is set to 25% or more, however, the possibility increases in that Hiragana character or the like is included in this range according to the depth of the document image. Accordingly, there is a problem in that Hiragana characters not suitable for character direction judgement are frequently selected.

On the other hand, when the document image is generally light, it is expected to generally lower the average of the black pixel ratio for each kind of characters shown in FIG. 19. Then, the possibility lowers in that Hiragana characters are included in the range of the black pixel ratio shown in FIG. 20, however, it is expected that a number of Chinese characters in this range decreases. Accordingly, in this case, data for character direction judgment decreases.

Then, in order to cope with such a case, the range of the black pixel ratio are dynamically varied. When the document image is generally deep, for example, the black pixel ratio shown in FIG. 4 is changed from 25% to 28%. On the contrary, when the document image is generally light, for example, the black pixel ratio shown in FIG. 4 is reduced to 22% from 25%.

Incidentally, the upper limit of the black pixel ratio is not shift in this case, since it is considered that the upper limit gives little influence to the character selection.

Returning to FIG. 20, in this sample, Chinese characters "富" and "通" satisfy three above-mentioned conditions. Therefore, as characters judging the character rotation/mirroring, these characters are selected.

In this embodiment, all of Chinese characters are not selected, and there is also a possibility in that characters except for Chinese characters are selected. The reason is that there are about a half of Chinese characters not satisfying the condition such as the black pixel ratio and the long-side to short-side ratio. In the example shown in FIG. 20, the Chinese character "±" has low black pixel ratio. It is expected that the character recognition rate becomes low concerning such a Chinese character, therefore, this Chinese character is not selected in spite of a Chinese character. Further, as to the Chinese character "月" at the top of the document, the long side is relatively longer than the short side, therefore, the possibility remains in that the character is alphanumeric or the like. Therefore, the Chinese character "月" is not selected in the case shown in FIG. 20.

Giving a consideration to the general tendency, the rate for selecting Chinese characters having high reliability is larger than the rate for selecting other characters, therefore, it is possible to achieve the object of this embodiment.

Figure 21A:
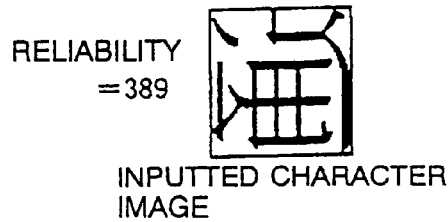
FIGS. 21(a) through 21(h) are samples of detected directions.
Figure 21B:
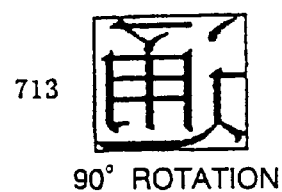
Figure 21C:
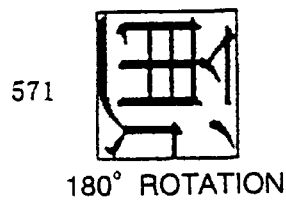
Figure 21D:
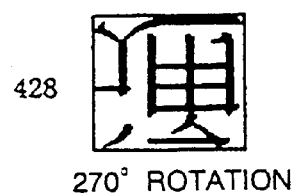
Figure 21E:
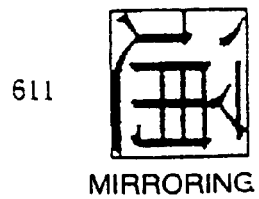
Figure 21F:
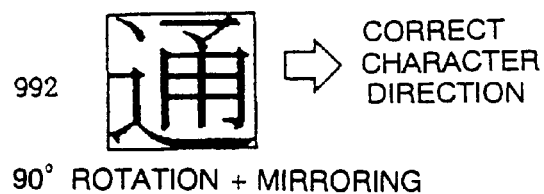
Figure 21G:
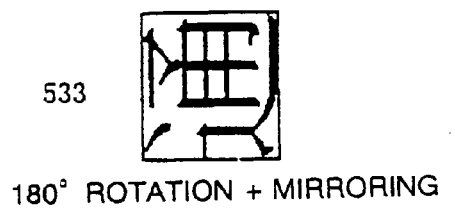
Figure 21H:

FIGS. 21(a) through 21(b) show reliability when a Chinese character "通" is read in eight directions including mirrored characters. It is assumed that the character is inputted in a state shown in FIG. 21(a) when inputted. Then, character recognition is executed for character images obtained by rotating the inputted character at angles of 0°, 90°, 180° and 270° and for character images obtained by mirroring the inputted character and rotating them at angles of 0°, 90°, 180° and 270°, and reliabilities are calculated as a result of the character recognition. Reliabilities are obtained by judging what degree characters stored in the dictionary and the inputted characters are accurate in the character recognition. Reliability about the eight directions are respectively shown at left sides of the characters. When these eight characters are compared, FIG. 21(f) shows the highest reliability (992), therefore, it is possible to judge that the character shown in FIG. 21(f) indicates a character erecting direction. Then, according to this judged character direction, the erecting process is executed for the whole document.

Figure 22A:
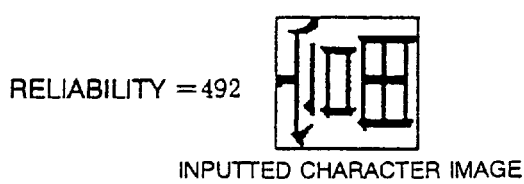
FIGS. 22(a) through 22(h) are samples of detected directions.
Figure 22E:
Figure 22B:
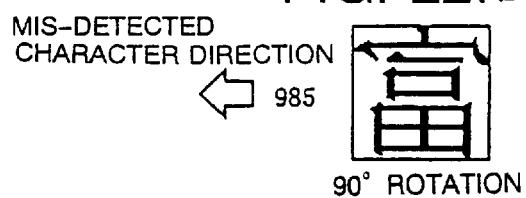
Figure 22F:
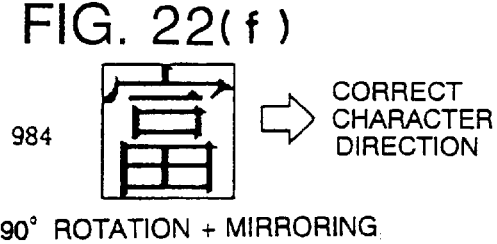
Figure 22C:
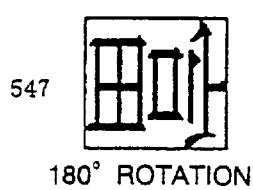
Figure 22G:
Figure 22D:
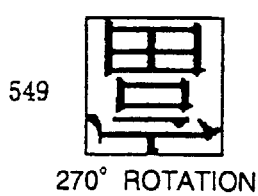
Figure 22H:

FIGS. 22(a) through 22(b) shows character images of the Chinese character "富" to which the same process explained in FIGS. 21(a) through 21(b) is applied. The condition and the like for inputting the character in FIGS. 21(a) through 21(h) are equal to those in FIGS. 22(a) through 22(h), therefore, it should be originally judged that FIG. 22(f) shows an erecting direction.

However, the Chinese character "富" is almost symmetric, therefore, though this character is mirrored, it is impossible to execute the character recognition with a character unit. Accordingly, there is a possibility in that the character image shown in FIG. 22(b) is judged as a correct direction. In this case, data capable of judging whether FIG. 22(b) or FIG. 22(f) is correct is only the reliability. The reliability in FIG. 22(b) is larger than that in FIG. 22(f) by only "1", therefore, FIG. 22(b) is judged as a correct direction though the character is mirrored.

In order to exclude the possibility producing such a problem, it is judged whether or not the inputted character is suitable to direction judgment, for example, in a case that the inputted character is symmetry.

As a concrete procedure, the following steps will be discussed.

First, the extracted character area is divided into two such as top and bottom or right and left at a central part. In FIGS. 22(a) through 22(h), the Chinese Character "富" is divided in two such as right and left. Then, a correlation is obtained for each pixel between one divided image and another divided image which is mirrored. When the correlation between both is very close, the character is judged as symmetry in right and left (or upper and lower), and this character is not used as data for judging the rotation/mirroring of the document.

As another procedure, it is possible to set a table storing characters symmetrical at a reference line (point) in the horizontal direction or in the vertical direction and a table storing characters impossible to be distinguished from another character as the result of the rotation/mirroring. When the rotation/mirroring of a character is judged, it is judged whether or not a symmetric character is set in the table. When a symmetric character is set, the character is not used for rotation judgment.

When examining the reliability obtained as the result of character recognition of the character image in each direction, there is a case in that the reliability is similarly low in each direction. This indicates that the reliability of the character recognition is low in any direction, therefore, it is possible to regard that the character recognition is not completed.

It is desirable not to use such a character image as a reference for the character direction judgement. Therefore, a threshold of the reliability is previously set in order to judge that the character recognition is carried out correctly. Then, the reliability calculated in each direction is compared with this threshold. When the reliabilities in all directions are below this threshold, the character recognition is not completed, therefore, the character direction detection is not carried out based on this character image. As a result, it is possible to improve the accuracy of the character direction detection.

Further, there is a case in that the high reliabilities are shown in plural directions as the result of calculating the reliability in each direction. In this case, a possibility can be considered in that the character image is mirrored as shown in FIG. 22(b) and a possibility can be considered in that the character image is recognized as a different character. Therefore, a threshold is set to judge that the character recognition is correctly carried out. When there are two or more directions in which the reliabilities exceed this threshold as to one character image, it is judged that there are some errors in the character recognition. Then, the character direction is not detected about this character.

Now, concerning the character recognition while changing the character direction, there is a case in that the character recognition is processed in parallel in respective directions, however, generally, the character recognition is sequentially processed. In this case, the character recognition is carried out in each character direction, and the direction detection process is terminated when two reliabilities over the threshold are obtained, thereby unnecessary to carry out the following process of the character recognition. In other words, when a reliability exceeds the threshold in the first direction and a reliability exceeds the threshold in the second direction, the direction detection process is terminated, thereby unnecessary to carry out the character recognition as to remaining six directions. The character recognition take comparatively a time, therefore, this procedure is very effective to make the process high-speed and efficient.

When the character direction is judged by paying an attention to only one character, there is a possibility in that the document image is corrected in a wrong direction by mis-judging the character direction.

Therefore, it is desirable to detect character directions of plural characters and to correct the document image based on the detected result.

For that purpose, a procedure can be mentioned in that a reliability is calculated for each character direction concerning N pieces of characters and an average of reliabilities is calculated for each direction, and then the direction having the highest average is judged as a correct character direction. With such a countermeasures, it is possible to improve an accuracy of the character direction detection rather than a case in that a direction is judged based on only one character.

Another method can be mentioned in that each character direction is dependently detected as to N pieces of characters and the character direction most frequently detected among the N pieces of characters is judged as a correct document direction.

Further, when characters having the same character direction continues, that character direction is supposed as the correct direction. Therefore, when it is detected that the same character direction is continuously detected as to a predetermined number of characters, that character direction is judged as a correct character direction.

There will be other various procedures, and a procedure of detecting the document direction with plural characters is very effective.

When it is impossible to detect the direction from the character images, there is a possibility in that the document can not be corrected in erecting. In this case, a document direction can be previously set to the apparatus. When it is impossible to detect the direction based on the character image, the document direction is determined based on the previously set document direction and the document can be corrected in erecting.

It is desirable to set a direction most frequently scanned with a scanner as the previously set document direction. In this case, though it is impossible to detect the document direction based on characters, the possibility capable of correcting the document image to an erecting image becomes very high.

Figure 23:
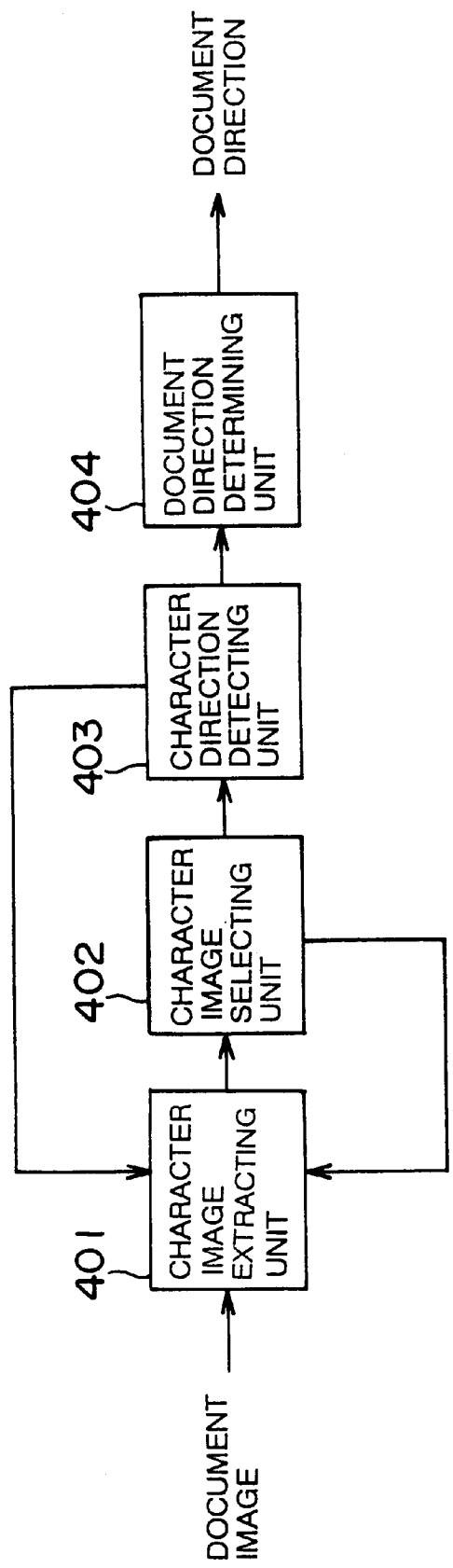
FIG. 23 is a block diagram showing details of the document direction detecting unit.

FIG. 23 is a block diagram showing the detail of the document direction detecting unit shown in FIG. 18. As shown in FIG. 23, the document direction detecting unit is provided with a character image extracting unit 401, a character image selecting unit 402, a character direction detecting unit 403 and a document direction determining unit 404.

Figure 24:
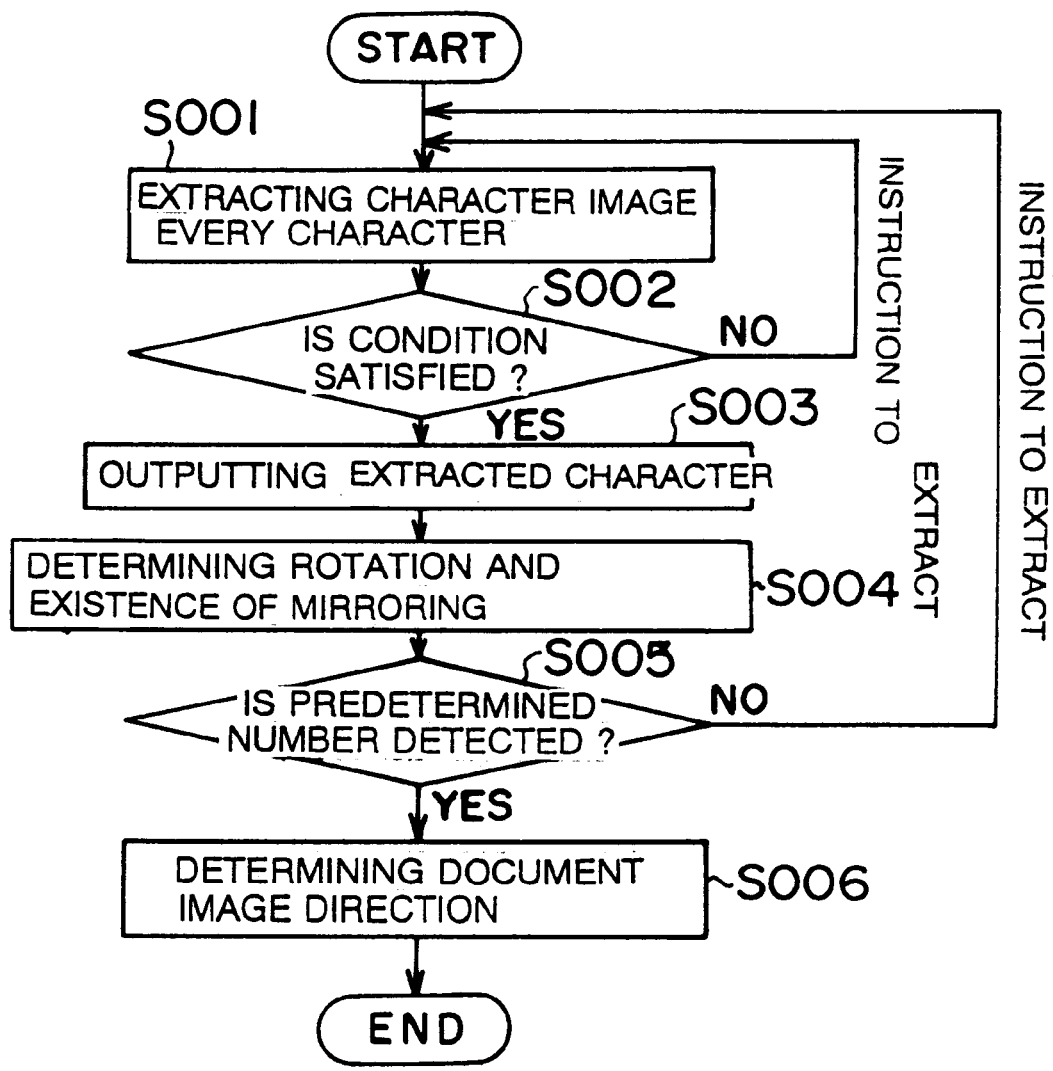
FIG. 24 is a flowchart showing a process executed in the document direction detecting unit.

FIG. 24 is a flowchart showing a process procedure executed in the document direction detecting unit shown in FIG. 23. Hereinafter, explanations will be given of the operation in the document direction detecting unit with reference to FIGS. 23 and 24.

The character image extracting unit 401 clips a character image from the inputted document image (S001). The character image is extracted in accordance with a character image extracting instruction from outside. The character image extracted by the character image extracting unit 401 is inputted into the character image selecting unit 402. Then, it is judged whether or not the extracted character image satisfies the previously set selection condition (such a condition shown in FIG. 20)(S002), and the character image judged as satisfying the condition is selected and outputted (S003).

The character image selecting unit 402 instructs the character image extracting unit 401 to clip another character image when the inputted image does not satisfy the set condition.

The character direction detecting unit 403 detects the character direction of the character image selected by the character image selecting unit 402, concretely, judges the rotated angle and an existence of mirroring, and then detects the character direction based on the rotated angle and the existence of mirroring (S004).

The character direction detecting unit 403 also counts direction detected results, and instructs the character image extracting unit 401 to clip a character image until obtaining a predetermined number of character direction results (S005).

Then, the character direction determining unit 404 determines the character direction of the inputted character image (S006).

Figure 25:
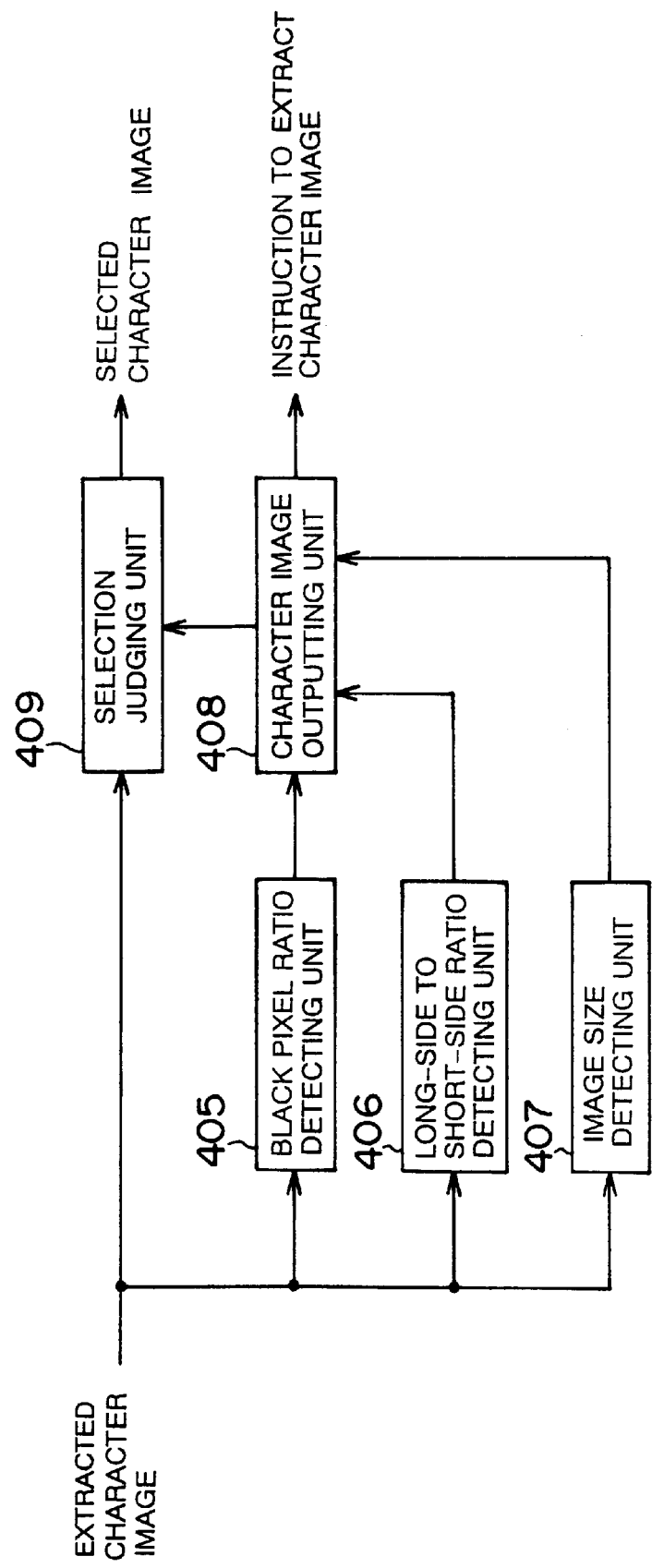
FIG. 25 is a block diagram showing details of the character image selecting unit.
Figure 26:
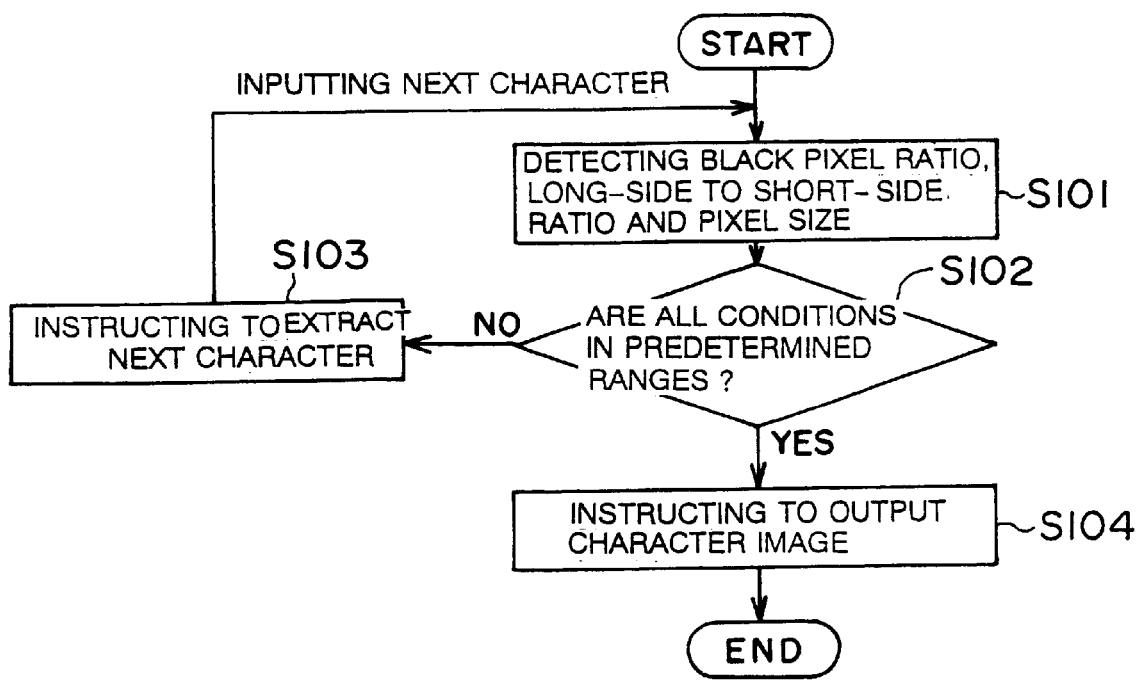
FIG. 26 is a flowchart showing a process executed in the character image selecting unit.

FIG. 25 is a view showing details of the character image selecting unit 402 shown in FIG. 23. FIG. 26 is a flowchart showing process in the document image selecting unit 402.

Hereinafter, explanations will be given of the character image selecting unit 402 with reference to FIGS. 25 and 26.

The character image extracted by the character image extracting unit 401 is respectively inputted into the black pixel ratio detecting unit 405, the long-side to short-side ratio detecting unit 406, the image size detecting unit 407, and the character image outputting unit 409 in parallel.

The black pixel ratio detecting unit 405 detects the black pixel ratio of the inputted character image, and outputs the detected result. The long-side to short-side ratio detecting unit 406 detects the long-side to short-side ratio of the inputted character image, and outputs the detected result. The image size detecting unit 407 detects the pixel size of the inputted character image, and outputs the detected result. Theses detected results of these unit are inputted into the selection judging unit 408 (S101).

The selection judging unit 408 judges whether or not the detected results inputted from respective units, namely, the black pixel ratio, the long-side to short-side ratio and the pixel size satisfy a predetermined condition (S102). When there is one or more detected results not satisfying the predetermined condition, it is judged this inputted character is unsuitable for the direction detection, therefore, this character is not selected. Then, the selection judging unit 408 instructs the character image extracting unit 401 to clip the next character image (S103).

On the other hand, when the character image satisfies the predetermined condition, the selection judging unit 408 gives an instruction to the character image outputting unit 409 (S104). The character image outputting unit outputs the inputted selection character image based on the instruction from the selection judging unit 408.

Figure 27:
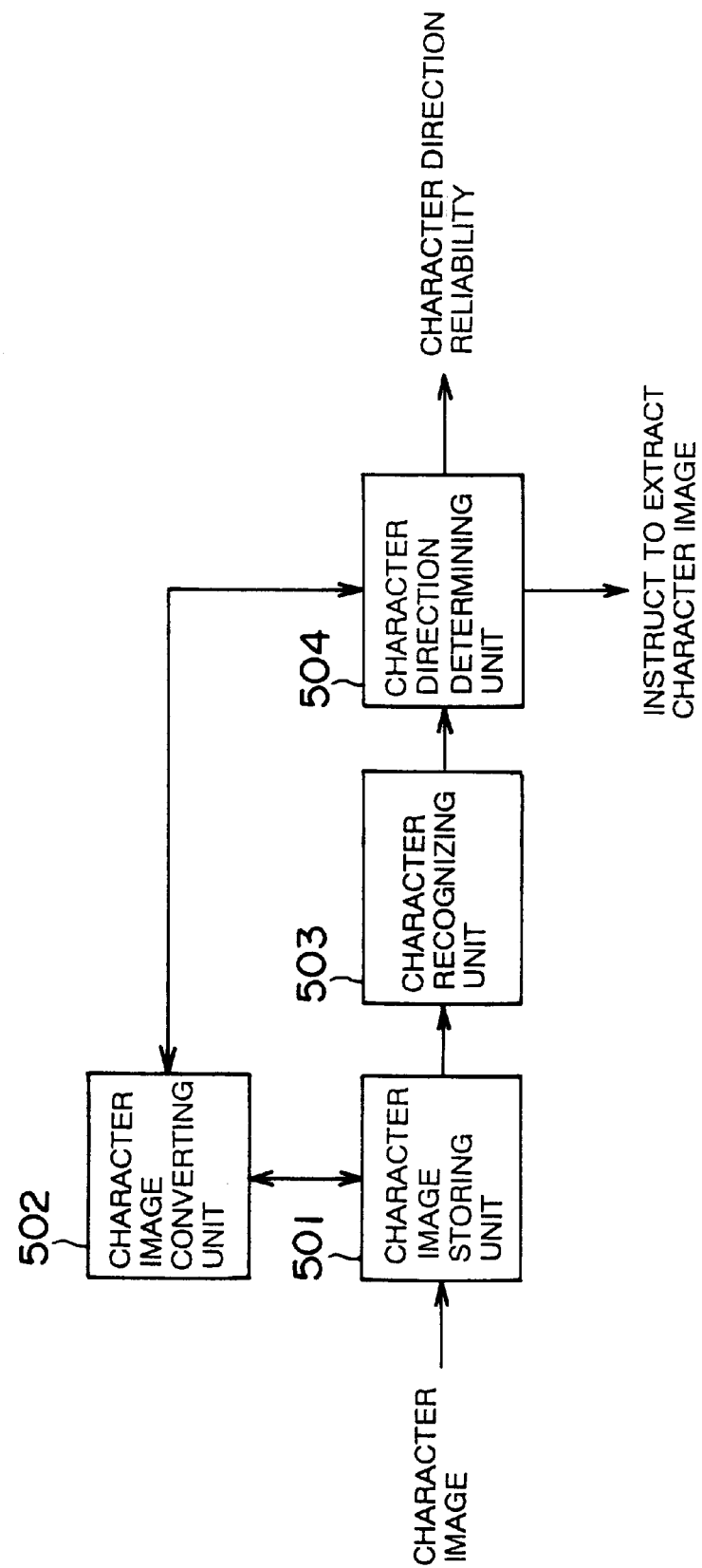
FIG. 27 is a block diagram showing details of the character direction detecting unit.
Figure 28:
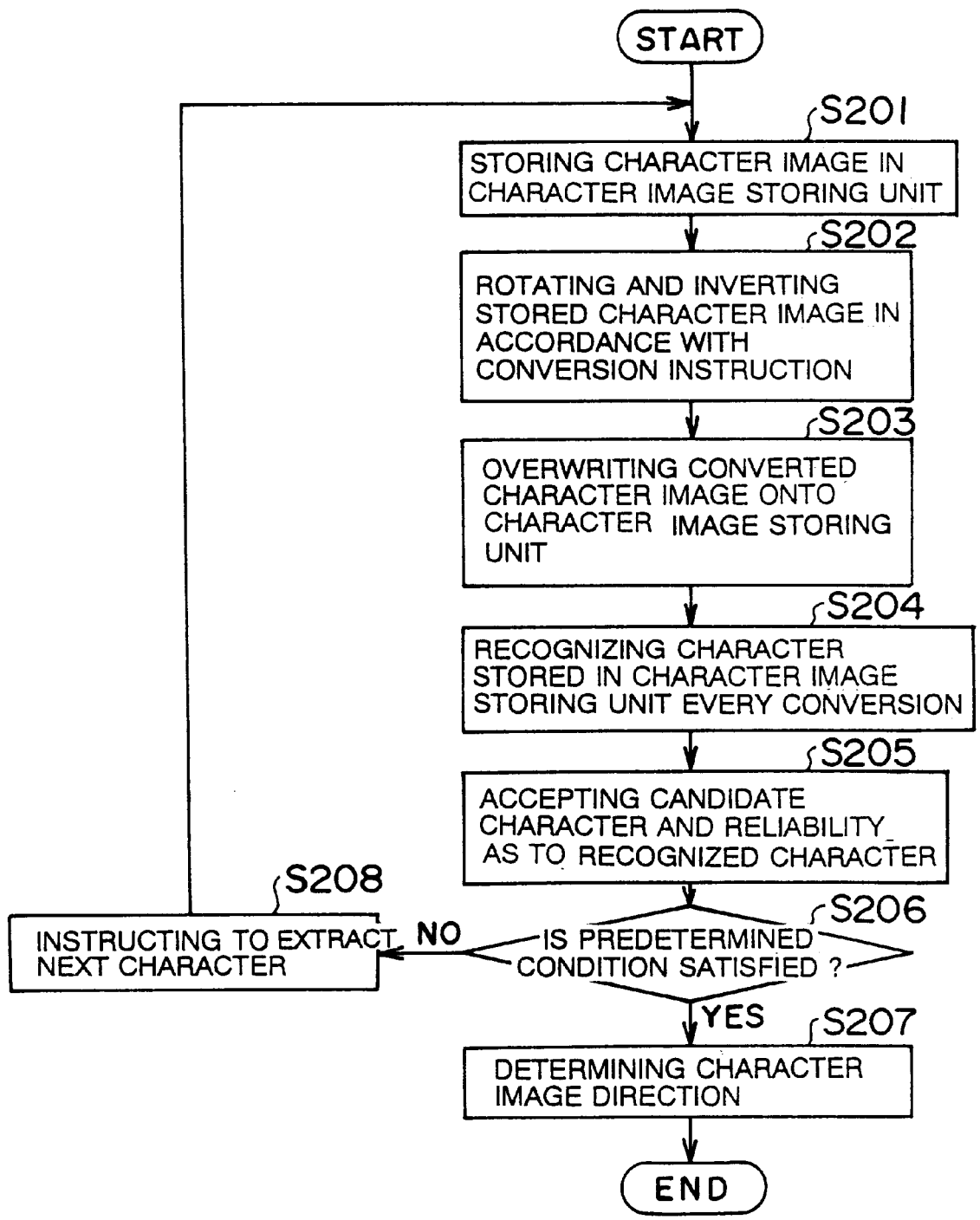
FIG. 28 is a flowchart showing a process executed in the character direction detecting unit.

FIG. 27 is a block diagram showing details of the character direction detecting unit 403 shown in FIG. 23. FIG. 28 is a flowchart showing processes executed in the character direction detecting unit 403. Hereinafter, explanations will be given of the character direction detecting unit 403 with reference to FIGS. 27 and 28.

The character image outputted from the document direction selecting unit 402 is inputted into the character image storing unit 501 and temporarily stored therein (S201). The character image converting unit 502 receives the character image inputted into the character image storing unit 501, and applies the rotation processes of 90°, 180° and 270° and the mirroring process to the inputted character image (S202). The character image of which the character direction is converted is sent to the character image storing unit 501 again and stored therein (S203).

The character image inputted into the character image storing unit 501 is successively inputted into the character recognizing unit 503. The character recognizing unit 503 carries out a well-known character recognition process (S204), and outputs a candidate character and a reliability obtained as the result of the character recognition for each direction to the character direction determining part 504 (S205).

Now, explanations will be given of timing between the character recognition process in the character recognizing unit 503 and the conversion process of the character image direction in the character image converting unit 502.

When the character image inputted from the character image selecting unit 401 is stored in the character image storing unit 501, the character recognizing unit 503 recognizes the inputted character image before the character image converting unit 502 changes the direction of the character image. When the first character recognition is finished, the character image converting unit 502 execute the first character direction conversion (for example, rotation of 90°), and the character recognizing unit 503 executes the second character recognition for the character to which the character direction conversion is applied. Successively, the character image converter 502 executes the second character direction conversion (rotation of 180°), and the character recognizing unit 503 executes the third character recognition.

In this way, the character recognition is executed whenever the character direction conversion is executed.

Output from the character recognizing unit 503 is inputted into the character direction determining unit 504. The character direction determining unit 504 sequentially instructs the character image converting unit 502 to convert the character image direction whenever receiving the output from the character recognizing unit 503. Further, the character direction determining unit 504 receives the candidate character and the reliability from the character recognizing unit 503, and judges whether these satisfy the predetermined condition (S206). When the candidate character and the reliability satisfy the predetermined condition, the character direction determining unit 504 determines the direction of the character image based on, in addition to the candidate character and the reliability, the character direction converting method in which the candidate character and the reliability are obtained and outputs the direction of the character image (S207).

Additionally, when no reliability or nothing satisfies the predetermined condition though the character direction is converted into any direction, the character direction determining unit 504 instructs the character image extracting unit 401 to clip the next character image (S208).

Figure 29:
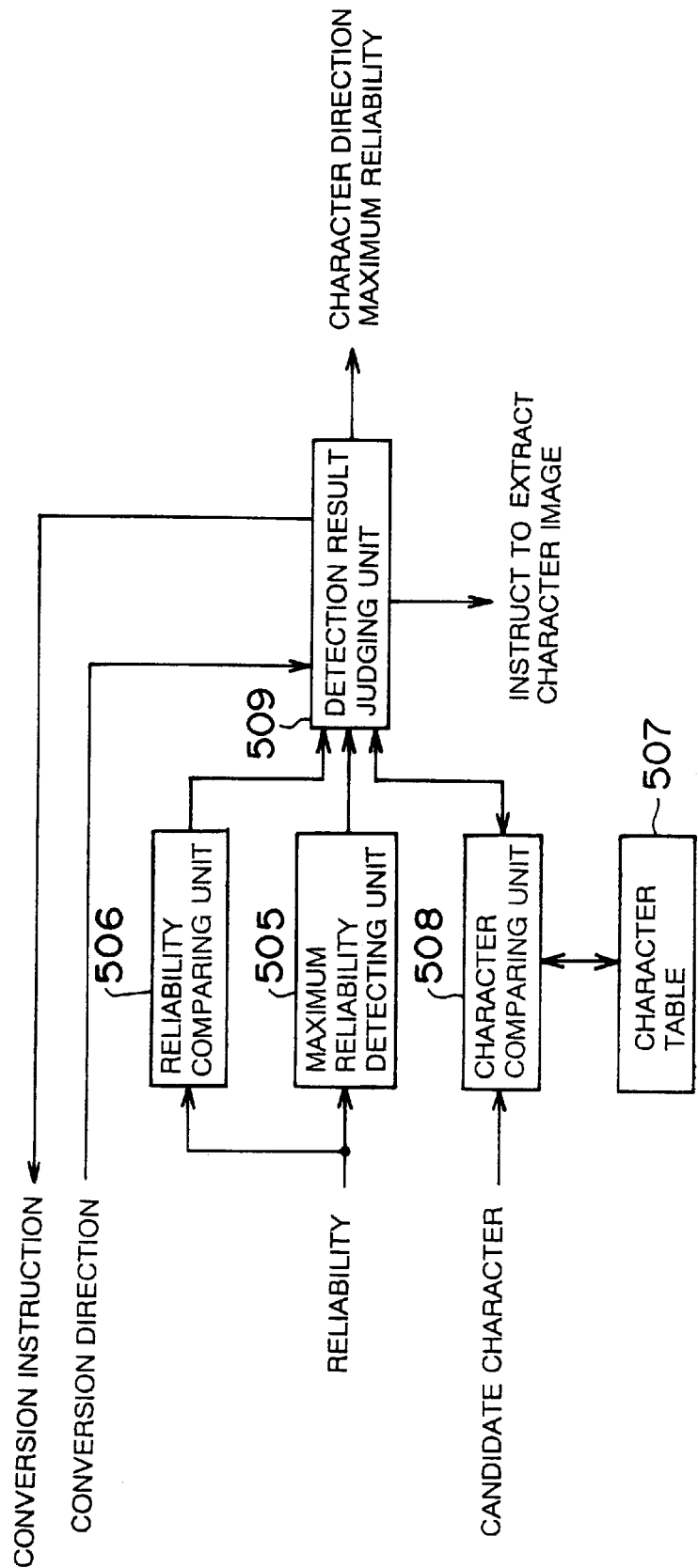
FIG. 29 is a block diagram showing details of the character direction determining unit.
Figure 30:
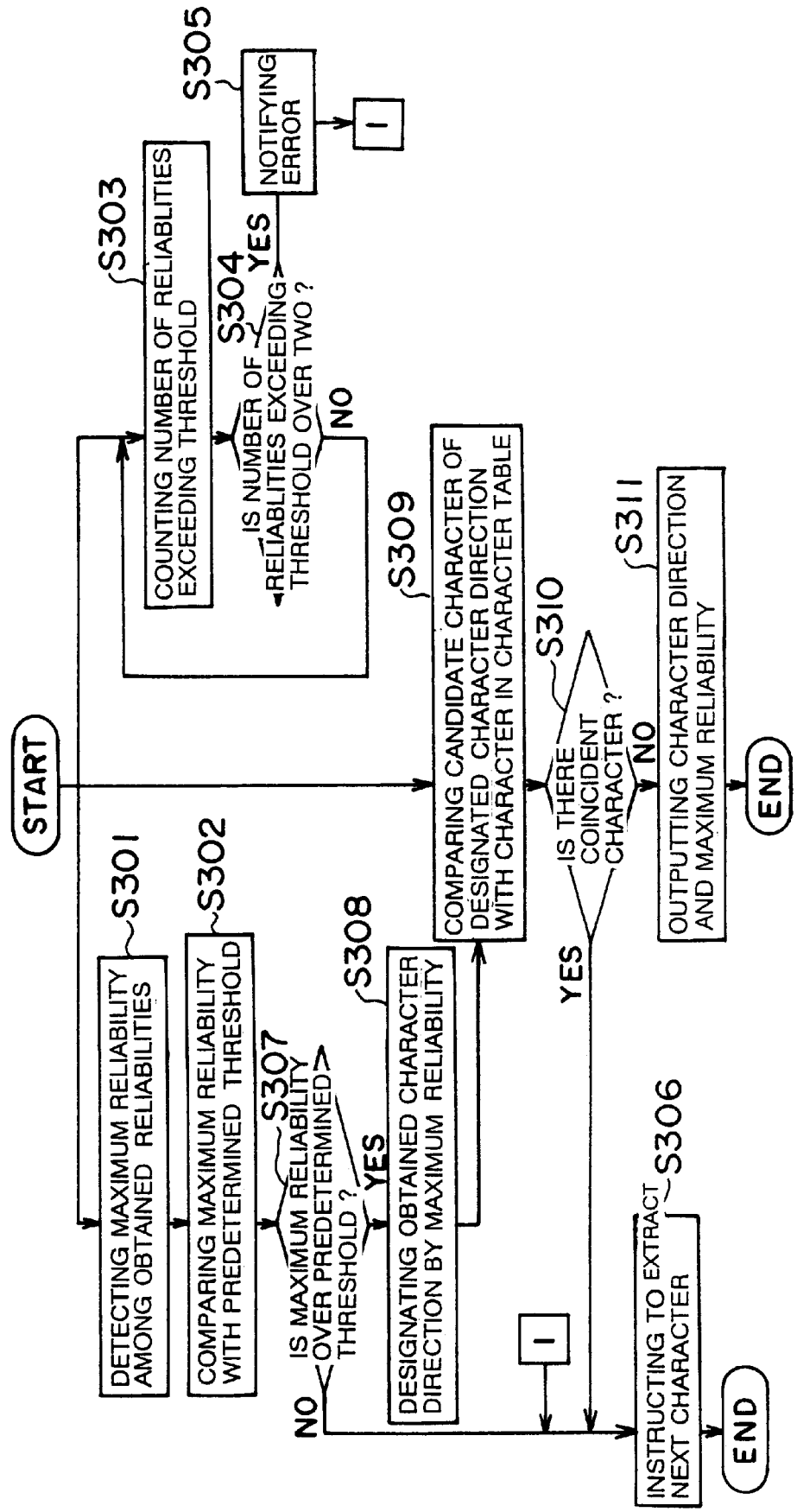
FIG. 30 is a flowchart showing a process executed in the character direction determining unit.
Figure 31:
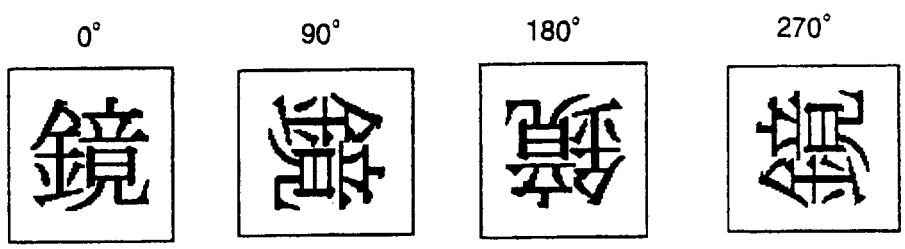
FIG. 31 shows a conventional sample.

FIG. 29 is block diagram showing more details of the character direction determining unit 404 shown in FIG. 23. FIG. 30 is a flowchart showing processes executed in the character direction determining unit 404. Hereinafter, explanations will be given of the action of the character direction determining unit 404 with reference to FIGS. 29 and 30.

The reliability outputted from the character direction detecting unit 403 is inputted into the maximum reliability detecting unit 505 and the reliability comparing unit 506 in parallel. The candidate character outputted from the character direction detecting unit 403 is inputted into the character comparing unit 508. Further, information concerning the direction conversion outputted from the character direction detecting unit 403 is inputted into the detection result judging unit 509.

First, the maximum reliability detecting unit 505 receives reliabilities of respective directions about specified character images to be inputted. Then, the maximum reliability detecting unit 505 detects the maximum reliability among these reliabilities and outputs it to the detection result judging unit 509 (S301). Further, a threshold is previously set in the reliability comparing unit 506, and the reliability comparing unit 506 compares the inputted reliability with this threshold sequentially (S302). When there is a reliability exceeding the threshold, the number of reliabilities is counted (S303). About one character image, when the number of reliabilities exceeding the threshold is over a predetermined number such as two (S304), the reliability comparing unit 506 notifies the detection result judging unit 509 of an error (S305).

The detection result judging unit 209 receives the maximum reliability from the maximum reliability detecting unit 505 and the error notice from the reliability comparing unit 506. The detection result judging unit 509, when receiving the error notice from the reliability comparing unit 506, terminates the direction determining process as to the character image in spite of the middle of the character direction determining process, and instructs the character image extracting unit 401 to clip the next character image (S306).

On the other hand, the detection result judging unit 509, when receiving no error notice, instructs the character direction detecting unit 403 to convert the character image.

After instructing to convert one character as to all directions, the detection result judging unit 509 compares the maximum reliability detected by the maximum reliability detecting unit 505 with the predetermined threshold (S307). When the maximum reliability is less than the predetermined threshold, no direction determination is executed about the character image. Then, the detection result judging unit 509 instructs the character image extracting unit 401 to clip the next character image (S306).

When the maximum reliability exceeds the threshold, the detection result judging unit 509 notifies the character comparing unit 508 of the character image direction at which the maximum reliability is obtained (S308). The character comparing unit 508 selects a candidate character of the specified direction, compares the candidate character with the character stored in the character table 507 (S309), and judges whether or not a coincident character exists (S310).

The character table 507 stores a list of characters to which no character direction detection is applied because of symmetry as to right and left or the like. The character comparing unit 508 compares the candidate character with the characters stored in the character table 507, thereby judging whether the candidate character can be used to detect the character direction or not.

When the coincident character exists in the character table 507, the character comparing unit 508 notifies the detection result judging unit 509 of that effect. In response to this, the detection result judging unit 509 judges that no direction determination is executed as to this character image, and instructs the character image extracting unit 401 to clip the next character image.

On the other hand, there is no character coincident with the candidate character in the character table 507, the character comparing unit 508 notifies the detection result judging unit 509 of that effect. In response to this, the detection result judging unit 509 outputs the character direction of this character and the maximum reliability (S311).

The outputted character direction and maximum reliability are used to erect the document image.

As above described, according to the second embodiment, a character having a high recognition rate in the character recognition (such as a Chinese character) is selectively extracted to judge the character direction, and the character direction is judged based on the extracted character. Thus, it is possible to improve the accuracy of the character direction judgement rather than the conventional technique.

This invention being thus described, it will be obvious that same may be varied in various ways. Such variations are not to be regarded as departure from the spirit and scope of the invention, and all such modifications would be obvious for one skilled in the art intended to be included within the scope of the following claims.

What is claimed is:

1. A image status detecting apparatus detecting whether or not a character image inputted through image input means is mirrored horizontally or vertically and/or detecting a rotation angle in 90 degree increments compared with an original character, said image status detecting apparatus comprising:

image converting means for rotating in 90 degree increments and for mirroring the character image inputted through the image input means;

character recognizing means for referencing a character recognition dictionary storing character feature information and for obtaining candidate characters resembling the character image mirrored and rotated by the image converting means and a recognition rate indicating a degree of recognition certainty; and conversion procedure detecting means for detecting, based on the candidate characters and the recognition rate obtained by the character recognizing means, a rotation angle in 90 degree increments and an existence of mirroring needed to direct the character image to a proper direction, based upon the recognition rate exceeding a predetermined value.

2. A document image correcting apparatus comprising:

character image storing means for storing a character image inputted through image input means;

image status detecting means for detecting whether or not the character image stored in the character image storing means is mirrored horizontally or vertically and detecting a rotation angle in 90 degree increments compared with an original character and setting the detection means to scan for a specified combination of mirroring and rotation in a predetermined order; and image correcting means for directing the character image stored in the character image storing means to a proper direction based on a detected result of the image status detecting means.

3. A document image correcting apparatus according to claim 2, said image status detecting means comprising:

image converting means for rotating and for mirroring the character image inputted through the image input means;

character recognizing means for referring to a character recognition dictionary storing character feature information and for obtaining candidate characters which resemble the character image mirrored and rotated by the image converting means and a recognition rate indicating a degree of recognition certainty; and conversion procedure detecting means for detecting, based on the candidate characters and the recognition rate obtained by the character recognizing means, a rotation angle in 90 degree increments and an existence of mirroring needed to direct the original character image to the proper direction.

4. A document image correcting apparatus according to claim 3, wherein said conversion procedure detecting means detects a rotated angle and/or an existence of mirroring in a case that the recognition rate of the character image obtained by the character recognizing means becomes maximum among all combinations of rotation and mirroring executed by the image converting means.

5. A document image correcting apparatus according to claim 3, wherein said conversion procedure detecting means detects a rotated angle and/or an existence of mirroring when the recognition rate obtained by the character recognizing means is over a predetermined value.

6. A document image correcting apparatus according to claim 2, further comprising:

document image storing means for storing a document image including a character line which consists of plural characters inputted through the image input means; and character image extracting means for extracting at least one character image from the document image inputted through the input image means;

wherein said character image storing means stores the character extracted by the character image extracting means, and wherein said image correcting means corrects the document image stored in said document image storing means to a proper image in a specified direction in accordance with a detected result of the image status detecting means.

7. A document image correcting apparatus according to claim 2, further comprising:

conversion controlling means for controlling said image converting means.

8. A document image correcting apparatus according to claim 7, wherein said conversion controlling means controls the image converting means so that the character image is converted in a state that rotation and mirroring are combined in a specified order.

9. A document image correcting apparatus according to claim 5, wherein said conversion controlling means controls the image converting means so that the character image is converted in order of high frequency among combinations of rotated angles and mirroring which previously make character images erecting.

10. A document image correcting apparatus according to claim 7, wherein said conversion controlling means controls the image converting means so that a character image is rotated every predetermined angle while mirrored.

11. A document image correcting apparatus according to claim 7, wherein said image correcting means does not correct character images not satisfying a specified condition as a result of character recognition as to all character images converted by said image converting means.

12. An image status detecting method comprising:

rotating in 90 degree increments and mirroring horizontally or vertically a character image inputted through an image input tool;

referencing a character recognition dictionary storing character feature information and obtaining candidate characters resembling the character image mirrored and rotated in the rotating and mirroring and a recognition rate indicating a degree of recognition certainty; and detecting, based on the candidate characters and the recognition rate obtained in the referencing and obtaining, a rotation angle in 90 degree increments and an existence of mirroring needed to direct the original character image to a proper direction, based upon the recognition rate exceeding a predetermined value.

13. A computer readable medium storing a program, said program when executed by a computer causes the computer to execute the functions comprising:

rotating and mirroring horizontally or vertically the character image inputted through the image input tool;

referencing a character recognition dictionary storing character feature information and obtaining candidate characters resembling the character image mirrored and rotated in the rotating and mirroring and a recognition rate indicating a degree of recognition certainty; and detecting, based on the candidate characters and the recognition rate obtained in the referencing, a rotation angle in 90 degree increments and an existence of mirroring needed to direct the original character image to a proper direction, based upon the recognition rate exceeding a predetermined value.

14. A document image correcting apparatus, comprising:

character image extracting means for extracting a character image satisfying a predetermined condition from an inputted document image;

character direction detecting means for detecting a rotation in 90 degree increments and an existence of mirroring as to the character image extracted by the character image extracting means, based upon frequency of previously detected use of the rotation and the existence of mirroring; and image correcting means for correcting the extracted character image to a proper character image in a specified direction in accordance with the detected rotation and existence of mirroring.

15. A document image correcting apparatus according to claim 14, wherein the predetermined condition is a ratio of a number of black pixels to a number of pixels in the character image extracted by the character image extracting means.

16. A document image correcting apparatus according to claim 14, wherein the predetermined condition is a length ratio of a long side to a short side of the character image extracted by the character image extracting means.

17. A document image correcting apparatus according to claim 14, wherein the predetermined condition is at least one of a number of pixels in a lengthwise direction and a number of pixels in a horizontal direction in the character image extracted by the character image extracting means.

18. A document image correcting apparatus according to claim 14, wherein said character image extracting means, when a character image having a high symmetry appears, does not extract the character image.

19. A document image correcting apparatus according to claim 14, wherein said character direction detecting means applies a character recognition to the character image extracted by the character image extracting means, and when a candidate character obtained as a result of the character recognition coincides with a predetermined character, does not detect a direction of the character image.

20. A document image correcting apparatus comprising:

character image extracting means for selectively extracting a character image satisfying a predetermined condition from an inputted document image;

character image converting means for applying a rotation process at a predetermined angle to the character image extracted by said character image extracting means, for applying the rotation process to the character image after applying a mirroring process, and for outputting the character image to which the rotation process and the mirroring process are applied;

character recognizing means for executing a character recognition as to each direction of the character image outputted from said character image converting means; and document direction determining means for determining a direction of the inputted document image based on a result of the character recognition executed by said character recognizing means and frequency of use of the rotation process and the mirroring process.

21. A document image correcting apparatus according to claim 20, wherein said character recognizing means outputs reliability information indicating an accuracy of the character recognition process as to each direction of the character image outputted from the character image converting means, and wherein said document direction determining means determines the direction of the inputted document image based on the reliability information of the character image outputted from said character recognizing means.

22. A document image correcting apparatus according to claim 20, wherein said document direction determining means detects a maximum reliability information among the reliability information inputted from said character recognizing means and determines the direction of the inputted document image based on the maximum reliability information.

23. A document image correcting apparatus according to claim 20, wherein said document direction determining means compares the reliability information inputted from said character recognizing means with a predetermined threshold, and executes no document direction determination based on the character image when no reliability information exceeds the predetermined threshold as to each direction of the character image.

24. A document image correcting apparatus according to claim 20, wherein said document direction determining means compares the reliability information inputted from said character recognizing means with a predetermined threshold, and executes no document direction determination based on the character image when a number of reliability information exceeds a predetermined number.

25. A document image correcting apparatus according to claim 20, wherein said document direction determining means detects directions of characters as to plural character images and determines the direction of the document image based on the directions which are detected.

26. A document image correcting apparatus according to claim 25, wherein said document direction determining means calculates an average of reliabilities of each character in each character direction as to plural character images, and determines the direction of the document image based on the average.

27. A document image correcting apparatus according to claim 25, wherein said document direction determining means determines a character direction obtaining a most number of maximum reliabilities among character directions having plural maximum reliabilities of each character image as a document direction.

28. A document image correcting apparatus according to claim 25, wherein said document direction determining means, when maximum reliabilities are obtained more than a predetermined number as to a character direction, determines the character direction as a document image direction.

29. A document image correcting method comprising:

selectively extracting a character image satisfying a predetermined condition from an inputted document image;

applying a rotation process at a predetermined angle to the character image which is selectively extracted and of applying the rotation process to the character image after applying a mirroring process;

outputting the character image to which the rotation process and the mirroring process are applied;

executing a character recognition as to each direction of the character image which is outputted; and determining a direction of the inputted document image based on a result of the character recognition and upon frequency of use of the rotation process and the mirroring process.

30. An information storage medium storing a program, said program when executed by a computer causes the computer to execute the functions comprising:

selectively extracting a character image satisfying a predetermined condition from an inputted document image;

applying a rotation process at a predetermined angle to the character image which is selectively extracted and of applying the rotation process to the character image after applying a mirroring process;

outputting the character image to which the rotation process and the mirroring process are applied;

executing a character recognition as to each direction of the character image which is outputted; and determining a direction of the inputted document image based on a result of the character recognition based upon frequency of use of the rotation process and the mirroring process.

31. A status detecting apparatus detecting what status a document image inputted through image input means is as to a proper direction, said status detecting apparatus comprising:

image converting means for producing a rotated image in 90 degree increments or a mirrored image from the document image inputted through the image input means;

character recognizing means for applying a character recognition process to each character included in the rotated image and the mirrored image produced by the image converting means; and conversion procedure detecting means for arranging the document image inputted through the image input means in the proper direction based on an image direction corresponding to a character recognition rate which is highest among the rotated image and the mirrored image as a result of character recognition by the character recognizing means, based upon the recognition rate exceeding a predetermined value.

32. A document image correcting apparatus, comprising:

input means for inputting a document image in an arbitrary direction;

selecting means for selecting a character image from the document image inputted through the input means;

judging means for judging a rotation and an existence of mirroring as to the selected character image compared to a standard direction; and arranging means for arranging all of the inputted document image into the standard direction based on the judging means, wherein the arranging including mirroring and rotating in 90 degree increments the document image.

33. A document image correcting method comprising:

inputting a character;

rotating in 90 degree increments the inputted character in a plurality of directions and of mirroring the character rotated in each direction;

executing character recognition as to the rotated and mirrored character;

selecting a character of which a recognition rate of the character recognition is highest; and converting the inputted character into a proper direction based on a rotation direction and an existence of mirroring of the selected character, based upon the recognition rate exceeding a predetermined value.

34. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character, wherein said image status detecting means includes:

image converting means for rotating and for mirroring the character image inputted through the image input means;

character recognizing means for referring a character recognition dictionary storing character feature information and for obtaining candidate characters resemble to the character image mirrored and rotated by the image converting means and a recognition rate indicating a degree of recognition certainty; and conversion procedure detecting means for detecting, based on the candidate characters and the recognition rate obtained by the character recognizing means, a rotation angle and an existence of mirroring needed to direct the original character image to the proper direction, wherein said conversion procedure detecting means detects a rotated angle and/or an existence of mirroring in a case that the recognition rate of the character image obtained by the character recognizing means becomes maximum among all combinations of rotation and mirroring executed by the image converting means; and image correcting means for directing the character image stored in the character image storing means to a proper direction based on a detected result of the image status detecting means and on frequency of directing to the direction.

35. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character, wherein said image status detecting means includes:

image converting means for rotating and for mirroring the character image inputted through the image input means;

character recognizing means for referring a character recognition dictionary storing character feature information and for obtaining candidate characters resemble to the character image mirrored and rotated by the image converting means and a recognition rate indicating a degree of recognition certainty; and conversion procedure detecting means for detecting, based on the candidate characters and the recognition rate obtained by the character recognizing means, a rotation angle and an existence of mirroring needed to direct the original character image to the proper direction, wherein said conversion procedure detecting means detects a rotated angle and/or an existence of mirroring when the recognition rate obtained by the character recognizing means is over a predetermined value; and image correcting means for directing the character image stored in the character image storing means to a proper direction based on a detected result of the image status detecting means and on frequency of directing to the direction.

36. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character;

image correcting means for directing the character image stored in the character image storing means to a proper direction based on a detected result of the image status detecting means and on frequency of directing to the direction; and conversion controlling means for controlling said image converting means so that the character image is converted in a state that rotation and mirroring are combined in a specified order.

37. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character;

image correcting means for directing the character image stored in the character image storing means to a proper direction based on a detected result of the image status detecting means and on frequency of directing to the direction; and conversion controlling means for controlling said image converting means so that the character image is converted in accordance with only a specified combination of rotation and mirroring among plural combinations of rotated angles and mirroring.

38. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character;

image correcting means for directing the character image stored in the character image storing means to a proper direction based on a detected result of the image status detecting means and on frequency of directing to the direction; and conversion controlling means for controlling said image converting means so that the character image is converted in order of high frequency among combinations of rotated angles and mirroring which previously make character images erecting.

39. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character;

image correcting means for directing the character image stored in the character image storing means to a proper direction based on a detected result of the image status detecting means and on frequency of directing to the direction; and conversion controlling means for controlling said image converting means so that a character image is rotated every predetermined angle while mirrored.

40. A document image correcting apparatus comprising:

character image storing means for storing a character image inputted through image input means;

image status detecting means for detecting whether or not the character image stored in the character image storing means is mirrored horizontally or vertically and what degree the character image is rotated compared with an original character;

image correcting means for directing the character image stored in the character image storing means to a proper direction based on a detected result of the image status detecting means and on frequency of directing to the direction, wherein said image correcting means does not correct character images not satisfying a specified condition as a result of character recognition as to all character images converted by said image converting means; and conversion controlling means for controlling said image converting means.

41. A document image correcting apparatus comprising:

character image extracting means for extracting a character image satisfying a predetermined condition from an inputted document image, wherein the predetermined condition is a ratio of a number of black pixels to a number of pixels in the character image extracted by the character image extracting means; and character direction detecting means for detecting a rotation and an existence of mirroring as to the character image extracted by the character image extracting means, based upon frequency of use of the rotation and the existence of mirroring.

42. A document image correcting apparatus comprising:

character image extracting means for extracting a character image satisfying a predetermined condition from an inputted document image, wherein the predetermined condition is a length ratio of a long side to a short side of the character image extracted by the character image extracting means; and character direction detecting means for detecting a rotation and an existence of mirroring as to the character image extracted by the character image extracting means, based upon frequency of use of the rotation and the existence of mirroring.

\* \* \* \* \*

UNITED STATES PATENT AND TRADEMARK OFFICE
CERTIFICATE OF CORRECTION

PATENT NO.    : 6,804,414 B1
DATED         : October 12, 2004
INVENTOR(S)   : Kenichiro Sakai et al.

It is certified that error appears in the above-identified patent and that said Letters Patent is hereby corrected as shown below:

Column 27,
Line 47, change "5" to -- 7 --.

Signed and Sealed this

Fourteenth Day of June, 2005

JON W. DUDAS
*Director of the United States Patent and Trademark Office*